(12) United States Patent
Onishi et al.

(10) Patent No.: US 12,222,300 B2
(45) Date of Patent: Feb. 11, 2025

(54) RADIOGRAPHIC INSPECTION METHOD, RADIOGRAPHIC INSPECTION APPARATUS, RADIOGRAPHIC INSPECTION SYSTEM, AND RADIOGRAPHIC INSPECTION PROGRAM

(71) Applicant: HAMAMATSU PHOTONICS K.K., Hamamatsu (JP)

(72) Inventors: Tatsuya Onishi, Hamamatsu (JP); Toshiyasu Suyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 212 days.

(21) Appl. No.: 17/918,168

(22) PCT Filed: Apr. 5, 2021

(86) PCT No.: PCT/JP2021/014554
§ 371 (c)(1),
(2) Date: Oct. 11, 2022

(87) PCT Pub. No.: WO2021/210442
PCT Pub. Date: Oct. 21, 2021

(65) Prior Publication Data
US 2023/0128795 A1   Apr. 27, 2023

(30) Foreign Application Priority Data
Apr. 16, 2020   (JP) .................................. 2020-073550

(51) Int. Cl.
*G01N 23/04*   (2018.01)
*G06V 10/25*   (2022.01)
*G06V 10/75*   (2022.01)

(52) U.S. Cl.
CPC ............. *G01N 23/04* (2013.01); *G06V 10/25* (2022.01); *G06V 10/751* (2022.01); *G01N 2223/423* (2013.01); *G06T 2207/20104* (2013.01)

(58) Field of Classification Search
CPC ............. G01N 23/04; G01N 2223/423; G01N 23/083; G01N 23/10; G01N 2223/643;
(Continued)

(56) References Cited

U.S. PATENT DOCUMENTS

| | | |
|---|---|---|
| 4,813,061 A | 3/1989 | Kakegawa |
| 2009/0080706 A1 | 3/2009 | Tao et al. |
| 2013/0223672 A1 | 8/2013 | Smith et al. |

FOREIGN PATENT DOCUMENTS

| | | |
|---|---|---|
| JP | S63-040533 A | 2/1988 |
| JP | H03-133278 A | 6/1991 |

(Continued)

OTHER PUBLICATIONS

International Preliminary Report on Patentability mailed Oct. 27, 2022 for PCT/JP2021/014554.

*Primary Examiner* — Kiho Kim
(74) *Attorney, Agent, or Firm* — Faegre Drinker Biddle & Reath LLP

(57) ABSTRACT

A radiographic inspection apparatus acquires a first image and a second image; receives an input of selection of a region of interest in the first image or the second image; specifies respective first pixel values of a plurality of first pixels and respective second pixel values of a plurality of second pixels corresponding to the plurality of first pixels, and calculates a thickness correction function by approximating a relationship between the first pixel values and the second pixel values; calculates a plurality of representative data each of which is a combination of a first representative value and a second representative value on the basis of the (Continued)

respective first pixel values of the plurality of first pixels and the respective second pixel values of the plurality of second pixels; and calculates an evaluation coefficient based on a correlation between the thickness correction function and the plurality of calculated representative data.

29 Claims, 24 Drawing Sheets

(58) Field of Classification Search
CPC ..... G01N 2223/1016; G01N 2223/303; G01N 2223/401; G06V 10/25; G06V 10/751; G06T 2207/20104; G06T 11/003
See application file for complete search history.

(56) References Cited

FOREIGN PATENT DOCUMENTS

| | | | | |
|---|---|---|---|---|
| JP | H06-261894 A | | 9/1994 | |
| JP | 2000-121579 A | | 4/2000 | |
| JP | 2008161690 A | * | 7/2008 | ............. A61B 6/481 |
| JP | 2010-046287 A | | 3/2010 | |
| JP | 2012-073056 A | | 4/2012 | |
| JP | 2013-101041 A | | 5/2013 | |
| WO | WO-2019/083014 A1 | | 5/2019 | |
| WO | WO-2019/235087 A1 | | 12/2019 | |

* cited by examiner

RADIOGRAPHIC INSPECTION METHOD, RADIOGRAPHIC INSPECTION APPARATUS, RADIOGRAPHIC INSPECTION SYSTEM, AND RADIOGRAPHIC INSPECTION PROGRAM

TECHNICAL FIELD

The present disclosure relates to a radiographic inspection method, a radiographic inspection apparatus, a radiographic inspection system, and a radiographic inspection program.

BACKGROUND ART

In the related art, a sample is inspected from an X-ray image using an energy subtraction method. For example, the following Patent Literature 1 describes an X-ray imaging method in which a region corresponding to a component to be removed is selected in either of two images having a sample imaged therein using an energy subtraction method and the component to be removed is effectively removed from the imaged image by performing correction of eliminating an influence of the thickness of the sample.

CITATION LIST

Patent Literature

[Patent Literature 1] Japanese Unexamined Patent Publication No. 2000-121579

SUMMARY OF INVENTION

Technical Problem

The foregoing method described in Patent Literature 1 is established on the premise that a region of interest which is a region corresponding to a component to be removed can be appropriately selected in an image. However, in some images, border lines between a plurality of parts constituting an article are unlikely to be recognized. In that case, according to a selection state of a region, regions other than a region corresponding to a substance to be removed in an image may also be selected and input so that an influence of the thickness of the substance may not be able to be appropriately eliminated and an image of the substance may not be appropriately removed from the image.

Hence, the present disclosure has been made in consideration of the foregoing problems, and an object thereof is to provide a radiographic inspection method, a radiographic inspection apparatus, a radiographic inspection program, and a radiographic inspection system, in which it is possible to evaluate whether or not a region of interest has been appropriately selected.

Solution to Problem

A radiographic inspection method according to an aspect of the present disclosure includes a first step of acquiring a first image in which an article is imaged in a state of being irradiated with a radiation having a first energy distribution, and a second image in which the article is imaged in a state of being irradiated with a radiation having a second energy distribution different from the first energy distribution; a second step of receiving an input of selection of a region of interest which is a region corresponding to a substance in which an influence of a thickness is eliminated in a region corresponding to the article in the first image or the second image; a third step of specifying respective first pixel values of a plurality of first pixels in a region corresponding to the region of interest in the first image and respective second pixel values of a plurality of second pixels corresponding to the plurality of first pixels in the second image, and calculating a function for expressing a relationship between the first pixel values and the second pixel values which is a thickness correction function for eliminating an influence of the thickness of the substance by approximating a relationship between the first pixel values and the second pixel values corresponding to the first pixel values; a fourth step of calculating a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels; and a fifth step of calculating an evaluation coefficient based on a correlation between the thickness correction function and the plurality of pieces of calculated representative data.

Alternatively, a radiographic inspection apparatus according to another aspect of the present disclosure includes at least one processor. The at least one processor acquires a first image in which an article is imaged in a state of being irradiated with a radiation having a first energy distribution, and a second image in which the article is imaged in a state of being irradiated with a radiation having a second energy distribution different from the first energy distribution; receives an input of selection of a region of interest which is a region corresponding to a substance in which an influence of a thickness is eliminated in a region corresponding to the article in the first image or the second image; specifies respective first pixel values of a plurality of first pixels in a region corresponding to the region of interest in the first image and respective second pixel values of a plurality of second pixels corresponding to the plurality of first pixels in the second image, and calculates a function for expressing a relationship between the first pixel values and the second pixel values which is a thickness correction function for eliminating an influence of the thickness of the substance by approximating a relationship between the first pixel values and the second pixel values corresponding to the first pixel values; calculates a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels; and calculates an evaluation coefficient based on a correlation between the thickness correction function and the plurality of pieces of calculated representative data.

Alternatively, a radiographic inspection system according to another aspect of the present disclosure includes the foregoing radiographic inspection apparatus; a radiation source configured to irradiate the article with a radiation having the first energy distribution and a radiation having the second energy distribution; and a detector configured to detect a radiation with which irradiation is performed from the radiation source, which is transmitted through the article, and which has the first energy distribution, and a radiation with which irradiation is performed from the radiation source, which is transmitted through the article, and which has the second energy distribution.

Alternatively, a radiographic inspection program according to another aspect of the present disclosure causes a computer to function as a first step of acquiring a first image in which an article is imaged in a state of being irradiated with a radiation having a first energy distribution, and a second image in which the article is imaged in a state of being irradiated with a radiation having a second energy distribution different from the first energy distribution; a second step of receiving an input of selection of a region of interest which is a region corresponding to a substance in which an influence of a thickness is eliminated in a region corresponding to the article in the first image or the second image; a third step of specifying respective first pixel values of a plurality of first pixels in a region corresponding to the region of interest in the first image and respective second pixel values of a plurality of second pixels corresponding to the plurality of first pixels in the second image, and calculating a function for expressing a relationship between the first pixel values and the second pixel values which is a thickness correction function for eliminating an influence of the thickness of the substance by approximating a relationship between the first pixel values and the second pixel values corresponding to the first pixel values; a fourth step of calculating a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels; and a fifth step of calculating an evaluation coefficient based on a correlation between the thickness correction function and the plurality of pieces of calculated representative data.

According to the method, the apparatus, the system, and the program described above, an input of selection of the region of interest is received in the first image or the second image, and the respective first pixel values of the plurality of first pixels in the region corresponding to the region of interest in the first image and the respective second pixel values of the plurality of second pixels corresponding to the plurality of first pixels in the second image are specified. Further, the thickness correction function is calculated by approximating a relationship between the first pixel values and the second pixel values corresponding to the first pixel values, and a plurality of pieces of representative data which are combinations of the first representative value which is a representative value of the first pixel values and the second representative value which is a representative value of the second pixel values are calculated. Further, the evaluation coefficient is calculated on the basis of the correlation between the thickness correction function and the plurality of pieces of representative data. Accordingly, it is possible to evaluate whether or not the region of interest corresponds to a single substance on the basis of the evaluation coefficient. Thus, according to the method, the apparatus, the system, and the program described above, it is possible to evaluate whether or not a region of interest has been appropriately selected.

Advantageous Effects of Invention

According to the present disclosure, it is possible to evaluate whether or not a region of interest has been appropriately selected.

DESCRIPTION OF EMBODIMENTS

Hereinafter, embodiments of the present disclosure will be described with reference to the drawings. In each of the drawings, the same reference signs are applied to parts which are the same or corresponding, and duplicate parts thereof will be omitted.

First Embodiment

[Constitution of Radiographic Inspection System]

Figure 1:
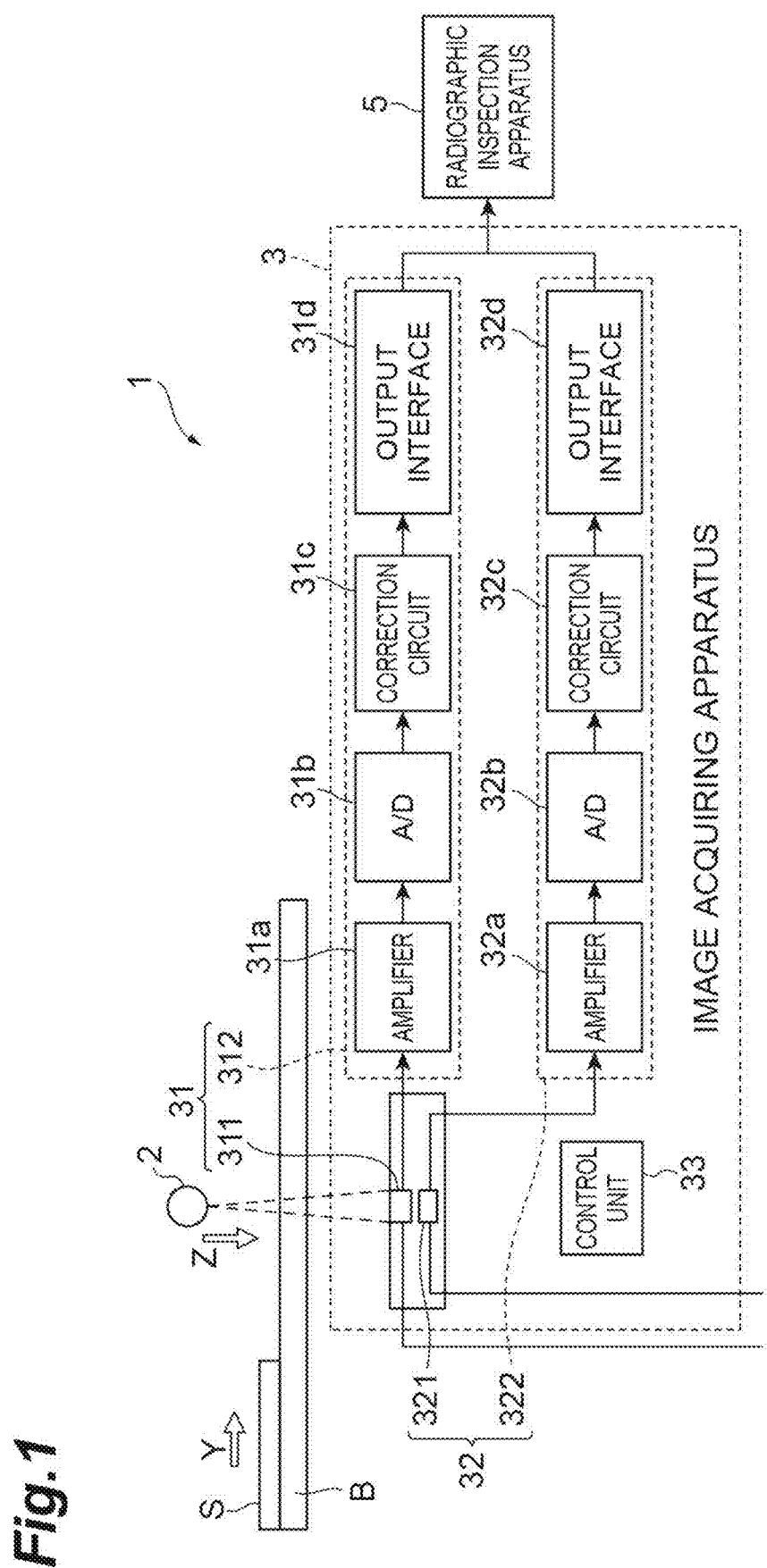
FIG. 1 is a schematic view of a constitution of a radiographic inspection system according to a first embodiment.
Figure 2:
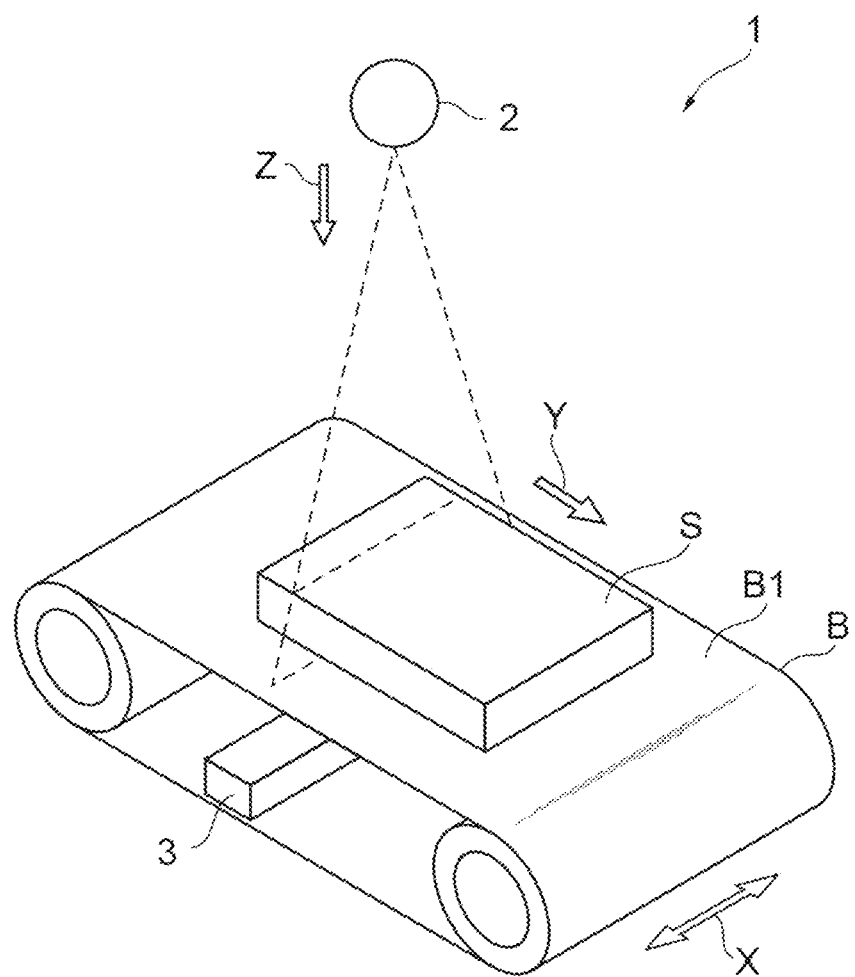
FIG. 2 is a perspective view illustrating the radiographic inspection system according to the first embodiment.

As illustrated in FIG. 1, a radiographic inspection system 1 includes an irradiator (radiation source) 2, an image acquiring apparatus (detector) 3, and a radiographic inspection apparatus 5. As illustrated in FIG. 2, the radiographic inspection system 1 is an apparatus which irradiates an article S with radiations having a plurality of energy distributions in an irradiation direction Z, acquires a plurality of images in which the article S is imaged in a state of being irradiated with radiations having the respective energy distributions, and performs inspection or the like for foreign matter included in the article S on the basis of the plurality of images. The radiographic inspection system 1 performs foreign matter inspection, weight inspection, article inspection, and the like targeted at the article S, and examples of purposes thereof include food inspection, baggage inspection, substrate inspection, battery inspection, and material inspection. In the present embodiment, the radiographic inspection system 1 irradiates the article S with X-rays from an X-ray source. The article S is conveyed in a conveyance direction Y at a predetermined conveyance speed in a state of being placed on a belt portion B1 of a belt conveyor B. Examples of the article S can include various articles including food such as meat, seafood, farm products, and confectionery; rubber products such as tires; resource materials such as resin products, metal products, and minerals; waste products; electronic parts; and electronic substrates.

The irradiator 2 is disposed above the belt portion B1 with a predetermined gap from the belt portion B1. The irradiator 2 is an apparatus performing irradiation toward the article S with X-rays in the irradiation direction Z and functions as an X-ray source. The irradiator 2 irradiates the article S with a radiation having a first energy distribution and a radiation having a second energy distribution different from the first energy distribution. For example, the first energy distribution has an energy band lower than that of the second energy distribution. The irradiator 2 is a point light source and performs irradiation such that X-rays are diffused within a predetermined angular range in an inspection direction X. The inspection direction X is a direction orthogonal to the irradiation direction Z and the conveyance direction Y. The irradiator 2 is constituted such that the entire article S is irradiated with X-rays in the inspection direction X (a width direction of the article S). In addition, the irradiator 2 irradiates the article S with X-rays over a division range which is a range smaller than a length of the entire article S in the conveyance direction Y. The irradiator 2 is constituted to irradiate the entire article S with X-rays in the conveyance direction Y when the article S is conveyed by the belt conveyor B in the conveyance direction Y.

The image acquiring apparatus 3 is disposed below a part where the article S is placed in the belt portion B1 and the irradiator 2 in the irradiation direction Z. The image acquiring apparatus 3 detects a radiation with which irradiation is performed from the radiation source, which is transmitted through the article S, and which has the first energy distribution, and a radiation with which irradiation is performed from the radiation source, which is transmitted through the article S, and which has the second energy distribution. Further, the image acquiring apparatus 3 acquires an image in which the article S is imaged in a state of being irradiated with a radiation having a predetermined energy distribution. The image acquiring apparatus 3 has a first image acquisition portion 31, a second image acquisition portion 32, and a control unit 33.

The first image acquisition portion 31 acquires a first image in which the article S is imaged in a state of being irradiated with a radiation having the first energy distribution. The first image acquisition portion 31 includes a first detection portion 311 and a first image correction portion 312.

The first detection portion 311 is positioned on an upstream side in the irradiation direction Z of X-rays. The first detection portion 311 detects a range of the first energy distribution of X-rays with which irradiation is performed from the irradiator 2 and which is transmitted through the article S and generates image data. Here, a method of generating image data by the first detection portion 311 will be described. The first detection portion 311 includes a scintillator layer (not illustrated) corresponding to the first energy distribution, and a line sensor (not illustrated) corresponding to the first energy distribution. The scintillator layer corresponding to the first energy distribution extends in the inspection direction X and converts an image of X-rays having the first energy distribution into an optical image. The line sensor corresponding to the first energy distribution has a plurality of pixels arrayed in the inspection direction X and generates image data based on an optical image converted by the scintillator layer. Image data acquired by the line sensor is constituted of a set of luminance data acquired for each pixel of the line sensor.

The first image correction portion 312 individually amplifies and corrects luminance data generated for each pixel by the first detection portion 311 and acquires image data which has been amplified and corrected. The first image correction portion 312 includes an amplifier 31a, an A/D conversion portion 31b, a correction circuit 31c, and an output interface 31d. The amplifier 31a amplifies luminance data of an image of X-rays having the first energy distribution. The A/D conversion portion 31b performs A/D conversion of luminance data of an image of X-rays having the first energy distribution amplified by the amplifier 31a. The correction circuit 31c performs predetermined correction processing with respect to luminance data converted by the A/D conversion portion 31b. The output interface 31d outputs image data corrected by the correction circuit 31c to the outside as the first image.

The second image acquisition portion 32 acquires a second image in which the article S is imaged in a state of being irradiated with a radiation having the second energy distribution. The second image acquisition portion 32 includes a second detection portion 321 and a second image correction portion 322.

The second detection portion 321 is disposed on a downstream side of the first detection portion 311 in the irradiation direction Z of X-rays. The second detection portion 321 detects a range of the second energy distribution of X-rays with which irradiation is performed from the irradiator 2 and which is transmitted through the article S and the first detection portion 311 and generates image data. Here, a method of generating image data by the second detection portion 321 will be described. The second detection portion 321 includes a scintillator layer (not illustrated) corresponding to the second energy distribution, and a line sensor (not illustrated) corresponding to the second energy distribution. The scintillator layer corresponding to the second energy distribution extends in the inspection direction X and converts an image of X-rays having the second energy distribution into an optical image. The line sensor corresponding to the second energy distribution has a plurality of pixels arrayed in the inspection direction X and acquires image data based on an optical image converted by the scintillator layer. Image data acquired by the line sensor is constituted of a set of luminance data acquired for each pixel of the line sensor. In the first detection portion 311 and the second detection portion 321, the line sensor of the first detection portion 311 and the line sensor of the second detection portion 321 may be constituted with one sensor. The line sensor may be a multi-line sensor having a plurality of pixels in a conveyance direction, a time delay integration (TDI) scanning X-ray camera, or a two-dimensional X-ray camera. In addition, a direct conversion-type sensor using no scintillator or an observation-type camera using a scintillator in optical lenses subjected to lens coupling may be used. A structure having a plurality of sensors corresponding to a plurality of radiation sources may be adopted. In addition, a range of the first energy distribution detected by the first detection portion 311 and a range of the second energy distribution detected by the second detection portion 321 may overlap each other in a portion. It has been described that the second detection portion 321 is disposed on a downstream side of the first detection portion 311 in the irradiation direction Z of X-rays, but the constitutions of the first detection portion 311 and the second detection portion 321 are not limited to those in the present embodiment. For example, the first detection portion 311 and the second detection portion 321 may be disposed in a parallel manner (such that they are positioned on an upstream side and a downstream side in the conveyance direction Y).

The second image correction portion 322 individually amplifies and corrects luminance data generated for each pixel by the second detection portion 321 and acquires image data which has been amplified and corrected. The second image correction portion 322 includes an amplifier 32a, an A/D conversion portion 32b, a correction circuit 32c, and an output interface 32d. The amplifier 32a amplifies luminance data of an image of X-rays having the second energy distribution. The A/D conversion portion 32b performs A/D conversion of luminance data of an image of X-rays having the second energy distribution amplified by the amplifier 32a. The correction circuit 32c performs predetermined correction processing with respect to luminance data converted by the A/D conversion portion 32b. The output interface 32d outputs luminance data corrected by the correction circuit 32c to the outside as the second image.

The control unit 33 controls a detection timing of X-rays in the first detection portion 311 and a detection timing of X-rays in the second detection portion 321. Specifically, the control unit 33 controls the detection timing of the first detection portion 311 and the detection timing of the second detection portion 321 such that X-rays which have been transmitted through one division range in the article S can also be detected by both the first image acquisition portion 31 and the second image acquisition portion 32. Due to control of the detection timing by the control unit 33, image deviation occurring in the first image and the second image during subtraction processing (which will be described below) is reduced.

In addition, the control unit 33 performs control using a known calibration member or the like such that each of the pixels of the first detection portion 311 and each of the pixels of the second detection portion 321 in the inspection direction X of the article S correspond to each other. Positions of each of the pixels of the first detection portion 311 and each of the pixels of the second detection portion 321 corresponding to each other deviate as they become closer to both ends in the inspection direction X due to the facts that the irradiator 2 is a point light source and X-rays radially spread. Hence, due to calibration control of the control unit 33, positional deviation between each of the pixels of the first detection portion 311 and each of the pixels of the second detection portion 321 is corrected, and image deviation between the first image and the second image is reduced. Through the foregoing processing, the first image and the second image are acquired such that each of the pixels of the first image and each of the pixels of the second image correspond to each other.

The radiographic inspection apparatus 5 is a data processing apparatus generating a difference image in which a region corresponding to a substance intended to be removed is removed. The radiographic inspection apparatus 5 may be a computation apparatus such as a personal computer, a microcomputer, a cloud server, or a smart device. The radiographic inspection apparatus 5 is connected to the image acquiring apparatus 3 such that data communication can be performed therebetween.

In either the first image or the second image, the radiographic inspection apparatus 5 receives an input of selection of a region of interest which is a region corresponding to a substance intended to be removed and executes correction processing of eliminating an influence of the thickness of the article S. Further, the radiographic inspection apparatus 5 generates a difference image in which a region corresponding to a substance intended to be removed is removed by executing subtraction processing of taking a difference between a pixel value of the first image subjected to logarithmic conversion and a pixel value of the second image subjected to logarithmic conversion. Further, the radiographic inspection apparatus 5 outputs a difference image to a display (not illustrated) included in an output device 105 which will be described below.

In addition, the radiographic inspection apparatus 5 performs processing of evaluating whether or not a region of interest has been appropriately selected before the processing of generating a difference image. Depending on the first image or the second image which has been acquired, there is a case in which border lines between a plurality of parts constituting the article S are unlikely to be recognized. In that case, depending on a selection state of a region, there is a case in which regions other than a region corresponding to a substance to be removed in the first image or the second image are also selected and input so that an influence of the thickness of the substance cannot be appropriately eliminated and thus the image of the substance is not appropriately removed from a difference image. Hence, in the radiographic inspection apparatus 5, processing of evaluating whether or not a region of interest has been appropriately selected is performed before the processing of generating a difference image, and therefore appropriate removal of the image of a substance intended to be removed in a difference image can be achieved. In the following description, "eliminating an influence of the thickness of a substance to be removed in an image" may be simply described as "eliminating the thickness of a substance".

[Constitution of Radiographic Inspection Apparatus]

Figure 3:
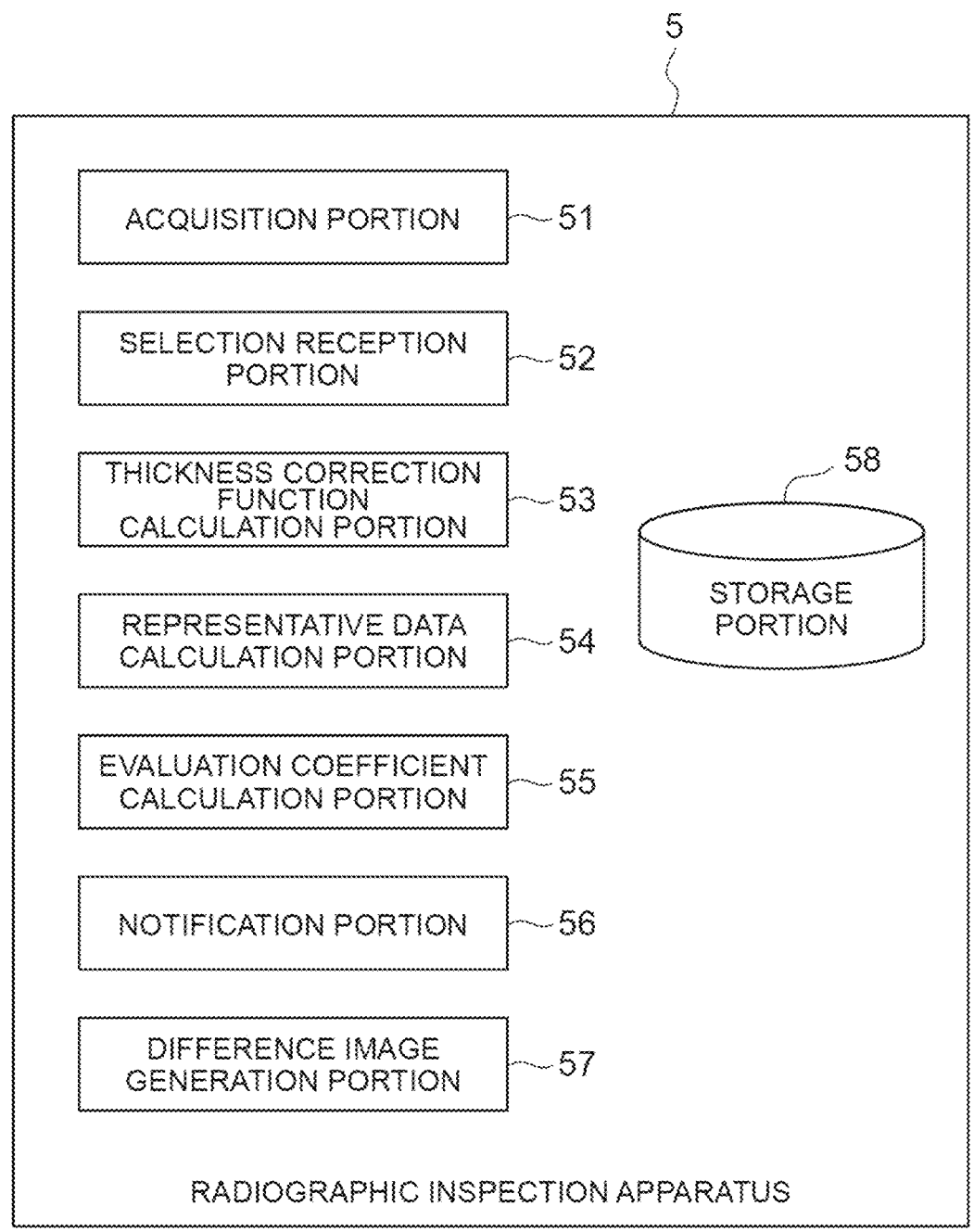
FIG. 3 is a block diagram illustrating a functional constitution of a radiographic inspection apparatus of the first embodiment.
Figure 4:
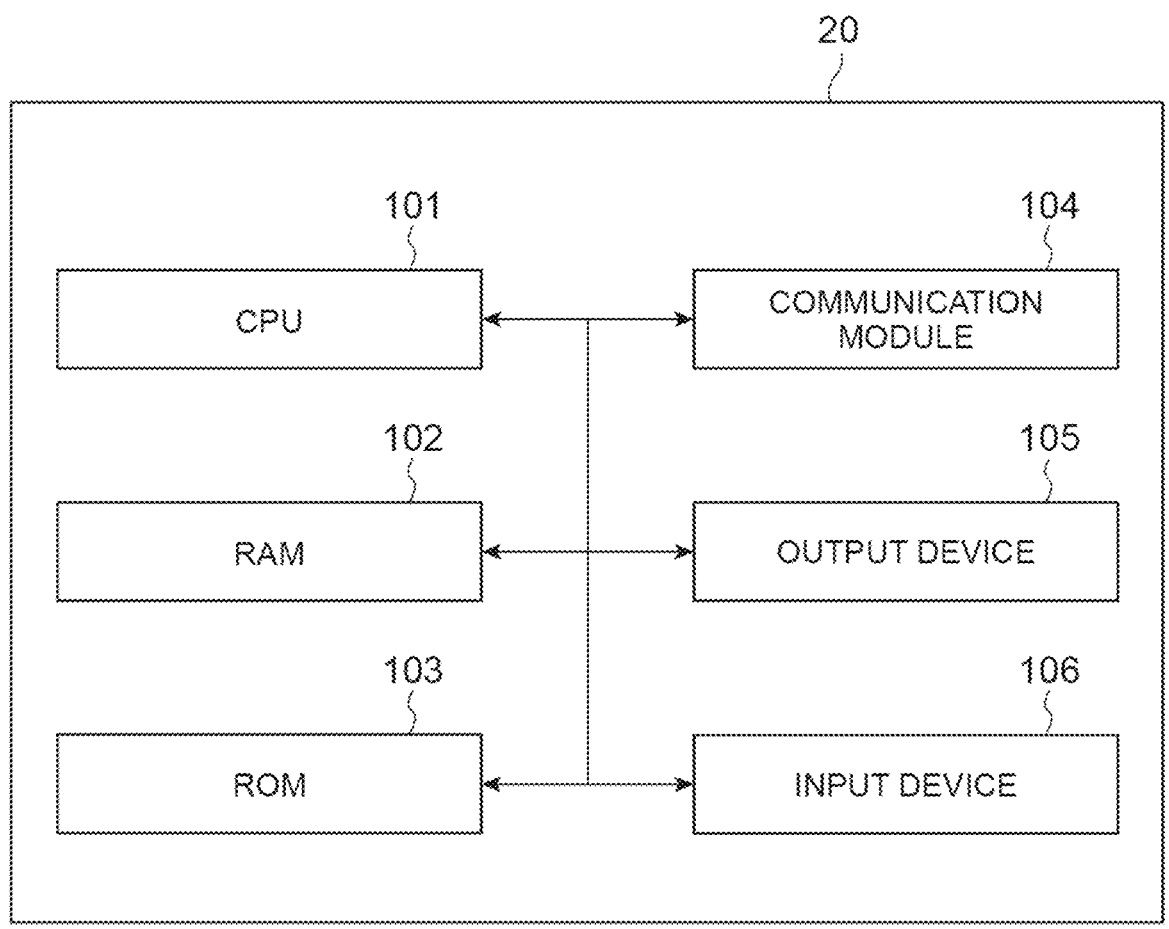
FIG. 4 is a block diagram illustrating a hardware constitution of a computer system including the radiographic inspection apparatus in FIG. 1.

Next, a detailed constitution of the radiographic inspection apparatus 5 will be described. As illustrated in FIG. 3, the radiographic inspection apparatus 5 is constituted to include an acquisition portion 51, a selection reception portion 52, a thickness correction function calculation portion 53, a representative data calculation portion 54, an evaluation coefficient calculation portion 55, a notification portion 56, a difference image generation portion 57, and a storage portion 58 as functional constituent elements. As illustrated in FIG. 4, a computer system 20 including the radiographic inspection apparatus 5 physically includes a central processing unit (CPU) 101 (processor), a random access memory (RAM) 102 (recording medium), a read only memory (ROM) 103, a communication module 104, the output device 105, an input device 106, and the like. Each of the functional portions of the radiographic inspection apparatus 5 described above is realized by operating the communication module 104, the output device 105, the input device 106, and the like and performing reading and writing of data in the RANI 102 and reading of data from the ROM 103 based on control of the CPU 101 in accordance with a radiographic inspection program according to the present embodiment read in hardware such as the CPU 101, the RANI 102, or the like. That is, the radiographic inspection program of the present embodiment causes the computer system 20 to function as the acquisition portion 51, the selection reception portion 52, the thickness correction function calculation portion 53, the representative data calculation portion 54, the evaluation coefficient calculation portion 55, the notification portion 56, the difference image generation portion 57, and the storage portion 58. The CPU may be a single piece of hardware or may be mounted in a programmable logic such as an FPGA as in a soft processor. The RAM and the ROM may also be a single piece of hardware or may be built into a programmable logic such as an FPGA.

Hereinafter, detailed functions of each of the functional portions of the radiographic inspection apparatus 5 will be described using a specific example of an image (the first image or the second image) P1 illustrated in FIGS. 5 and 6.

The acquisition portion 51 acquires the first image and the second image that are images of X-rays which have been transmitted through the entire article S from the image acquiring apparatus 3. The image P1 illustrated in FIGS. 5 and 6 is an example of the first image or the second image acquired by the first image acquisition portion 31. In the image P1, the article S in a state of being irradiated with a radiation having the first energy distribution or the second energy distribution is imaged. The article S in the present specific example is a general-purpose connector and has a casing 51 and a plurality of terminals S2. The casing 51 is made of a resin and includes a plurality of cavities. Each of the terminals S2 is disposed in each of the cavities of the casing 51 and is made of a metal. Each of the terminals S2 is disposed in (or occupies) a part of the cavities.

The selection reception portion 52 receives an input of selection of the region of interest. The region of interest is a region corresponding to a substance in which an influence of the thickness is eliminated in a region corresponding to the article S in the first image or the second image. For example, an input of selection of the region of interest is performed when the first image or the second image is displayed in the display included in the output device 105 and when a user of the radiographic inspection apparatus 5 selects the region of interest on the display via a mouse or the like included in the input device 106.

Figure 5:
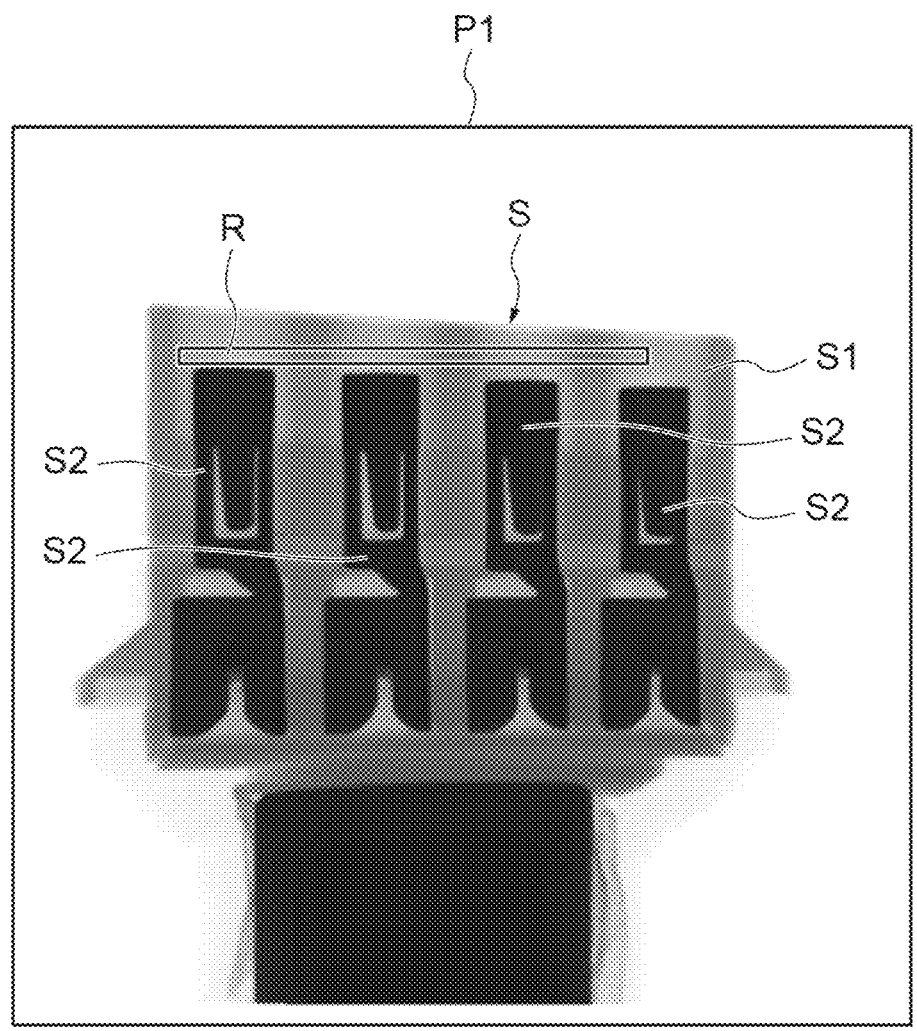
FIG. 5 is a view illustrating an example of a region of interest selected and input by a selection reception portion in FIG. 3.
Figure 6:
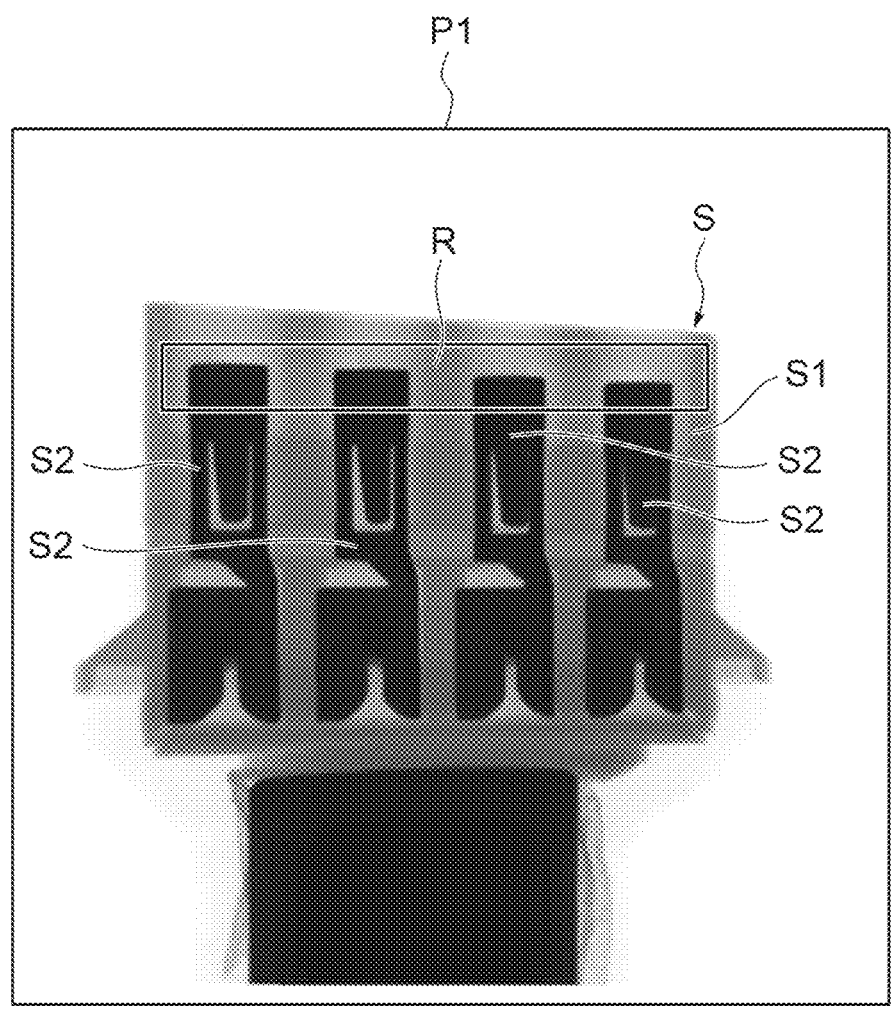
FIG. 6 is a view illustrating another example of the region of interest selected and input by the selection reception portion in FIG. 3.

In the example illustrated in FIG. 5, only the region corresponding to the resin of the casing S1 in the image P1 is selected as a region R of interest. Namely, in the example illustrated in FIG. 5, only a substance in which an influence of the thickness is eliminated (a resin including the cavity parts excluding the terminals S2) in the image shown in the image P1 has been correctly selected as the region R of interest. At this time, it is favorable that information of various thicknesses be included in the region of interest. On the other hand, in the example illustrated in FIG. 6, the region corresponding to the resin of the casing S1 and the terminals S2 in the image P1 are selected as the region R of interest. Namely, in the example illustrated in FIG. 6, a substance in which an influence of the thickness is eliminated and other substances (metal) in the image shown in the image P1 are selected as the region R of interest, and the region R of interest is not correctly selected.

The thickness correction function calculation portion 53, the representative data calculation portion 54, the evaluation coefficient calculation portion 55, and the notification portion 56 are constituent elements for realizing processing of evaluating whether or not a region of interest has been appropriately selected, of the processing executed by the radiographic inspection apparatus 5. Hereinafter, together with description of each of the constituent elements, an overview of processing of evaluating whether or not a region of interest has been appropriately selected will be described.

The thickness correction function calculation portion 53 calculates a thickness correction function for eliminating an influence of the thickness of a substance. A thickness correction function is a function for expressing a relationship between a first pixel value and a second pixel value. Here, a method of calculating a thickness correction function will be described. First, the thickness correction function calculation portion 53 performs logarithmic conversion of the first image and the second image acquired by the acquisition portion 51. Here, although logarithmic conversion is not essential, it is favorable to perform logarithmic conversion for making an approximation function.

Further, the thickness correction function calculation portion 53 specifies the first pixel value and the second pixel value. The first pixel value is a pixel value for each of a plurality of first pixels in a region corresponding to the region of interest in the first image subjected to logarithmic conversion. The second pixel value is a pixel value for each of a plurality of second pixels corresponding to the plurality of first pixels in the second image subjected to logarithmic conversion. A plurality of second pixels corresponding to the plurality of first pixels mentioned here denotes each of the pixels in a region corresponding to the region of interest in the second image. Namely, the thickness correction function calculation portion 53 performs logarithmic conversion of the first image and the second image and specifies each of the pixel values in the region corresponding to the region of interest in each of the first image and the second image subjected to logarithmic conversion. A timing of processing of logarithmic conversion of the first image and the second image is not particularly limited. For example, the processing may be performed immediately after acquisition by the acquisition portion 51. In addition, for example, the processing may be performed after reception of selection of a region of interest by the selection reception portion 52.

Further, the thickness correction function calculation portion 53 calculates a thickness correction function by approximating a relationship between the first pixel value and the second pixel value corresponding to the first pixel value. A relationship between the first pixel value and the second pixel value corresponding to the first pixel value mentioned here denotes a relationship between a pixel value of one first pixel and a pixel value of the second pixel corresponding to the one first pixel. Specifically, for example, when a pixel value of the pixel at the uppermost left end portion in the region of interest in the first image is regarded as the first pixel value, a pixel value of the pixel at the uppermost left end portion in the region of interest in the second image is the second pixel value corresponding to the first pixel value.

In the present embodiment, for example, the thickness correction function calculation portion 53 calculates a coefficient of an approximation curve by approximating a plurality of sample points in an Nth-order (N is a natural number of 1 or larger) approximation curve on two-dimensional coordinates using a least squares method. Accordingly, the thickness correction function calculation portion 53 calculates a thickness correction function which is a function for expressing the approximation curve. A plurality of sample points are points expressing the first pixel value and the second pixel value and are points plotted on two-dimensional coordinates having the first pixel value as an X axis and having the second pixel value as a Y axis, for example.

Figure 7:
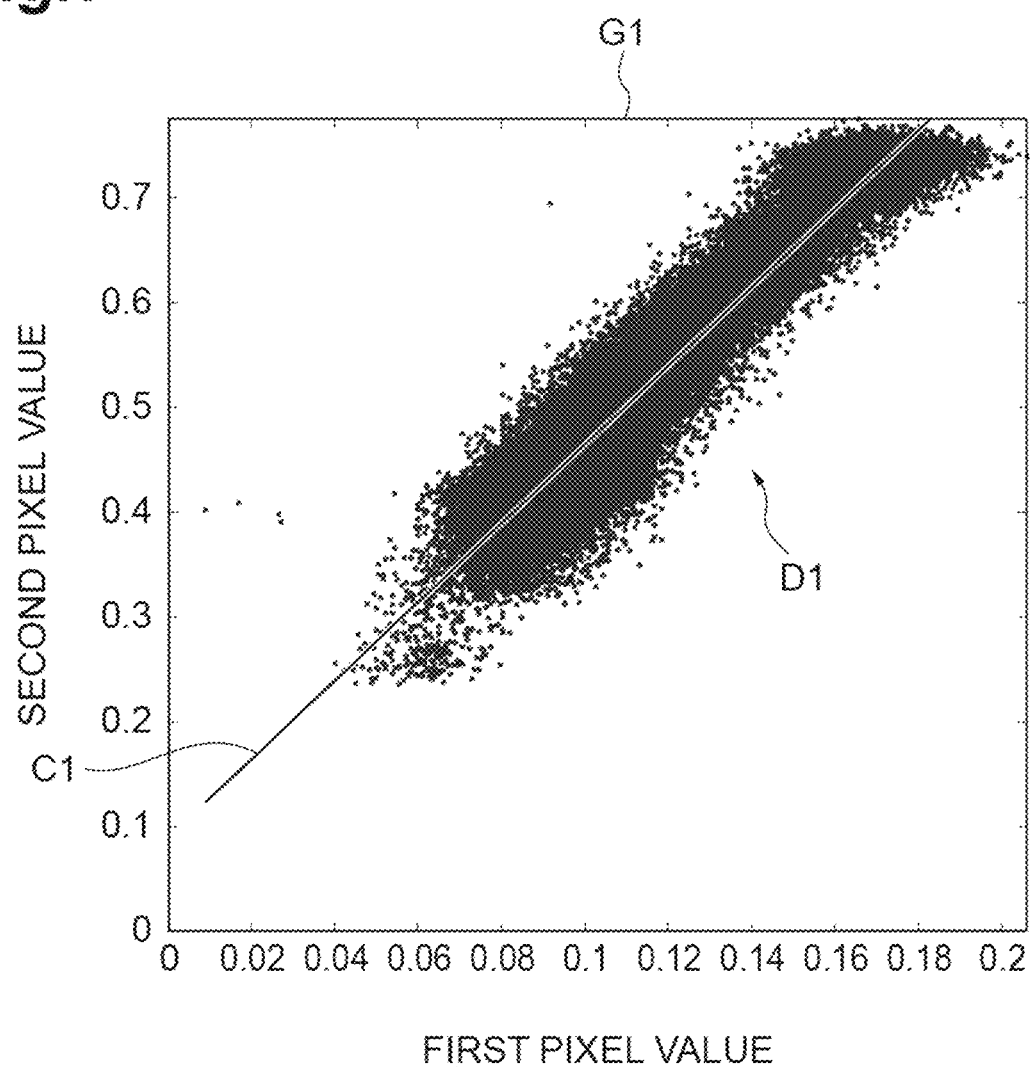
FIG. 7 is a view illustrating an example of a graph expressing sample points and an approximation curve corresponding to the region of interest in FIG. 5.

The graph G1 shown in FIG. 7 is a graph expressing a plurality of sample points D1 and an approximation curve C1 on two-dimensional coordinates. The horizontal axis (X axis) in the graph G1 indicates the first pixel value, and the vertical axis (Y axis) in the graph indicates the second pixel value. Each of the sample points D1 is a sample point which is calculated in a manner corresponding to the region R of interest illustrated in FIG. 5 and expresses the first pixel value and the second pixel value corresponding to the first pixel value. The number of the sample points D1 is equivalent to the number of pixels in the first image corresponding to the region R of interest (and the number of pixels in the second image). The approximation curve C1 is a curve of a quadratic thickness correction function ($y=ax^2+bx+c$) calculated by quadratic approximation of the plurality of sample points D1.

Figure 8:
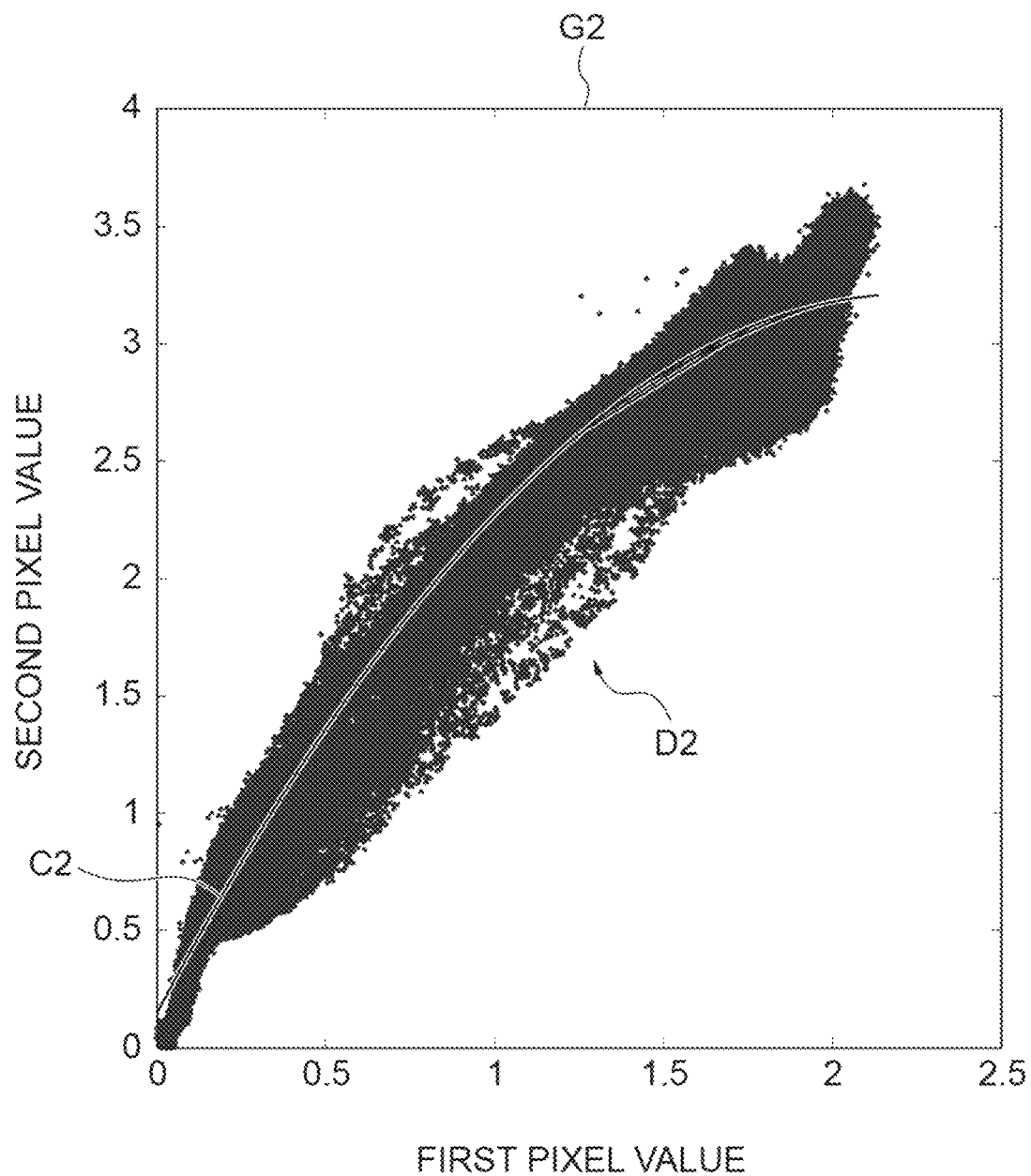
FIG. 8 is a view illustrating an example of a graph expressing sample points and an approximation curve corresponding to the region of interest in FIG. 6.

The graph G2 shown in FIG. 8 is a graph expressing a plurality of sample points D2 and an approximation curve C2 on two-dimensional coordinates. Similar to FIG. 7, the horizontal axis (X axis) in the graph indicates the first pixel value, and the vertical axis (Y axis) in the graph indicates the second pixel value. Each of the sample points D2 is a sample point which is calculated in a manner corresponding to the region R of interest illustrated in FIG. 6. As illustrated in FIG. 8, the plurality of sample points D2 are distributed over a wide range compared to the sample points D1 calculated in a manner corresponding to the region R of interest which has been correctly selected (refer to FIG. 7). This is because the plurality of sample points D2 are calculated on the basis of the region R of interest constituted of not only the pixels corresponding to the resin but also pixels of parts other than the resin (parts corresponding to the terminals S2 in FIG. 6) in the image P1. The approximation curve C2 is a curve of a quadratic thickness correction function ($y=ax^2+bx+c$) calculated by quadratic approximation of the plurality of sample points D2. A curvature of the approximation curve C2 is larger than the approximation curve C1 (refer to FIG. 7) of the thickness correction function calculated in a manner corresponding to the region R of interest which has been correctly selected.

The representative data calculation portion 54 calculates a plurality of pieces of representative data on the basis of the respective first pixel values of the plurality of first pixels and the respective second pixel values of the plurality of second pixels corresponding to the plurality of first pixels. The representative data is a combination of a first representative value and a second representative value. The first representative value is a representative pixel value of the first image subjected to logarithmic conversion, and the second representative value is a representative pixel value of the second image subjected to logarithmic conversion. In the present embodiment, the representative data is calculated while one first pixel value is regarded as the first representative value and the average value of one or a plurality of second pixel values corresponding to the one first pixel value is regarded as the second representative value. Specifically, when one first pixel value is regarded as a representative value and there is one second pixel value corresponding to the one first pixel, the second pixel value is regarded as the second representative value. When there are a plurality of second pixel values corresponding to the one first pixel, the average value of the second pixel values is regarded as the second representative value. The representative data calculation portion 54 calculates a plurality of pieces of representative data by repeating processing of selecting the first pixel values (first representative values) at predetermined intervals, for example, by 0.01 and calculating the second representative values.

Figure 9:
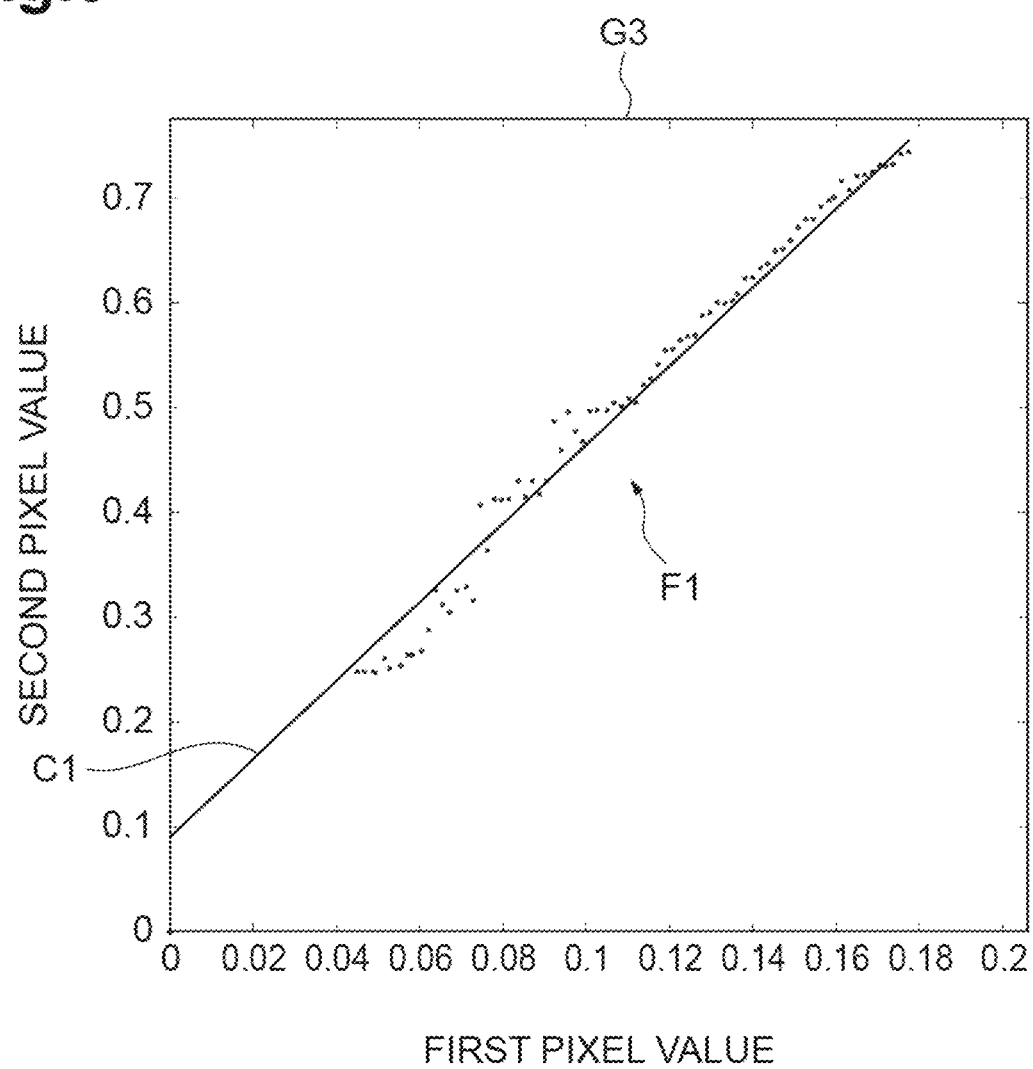
FIG. 9 is a view illustrating an example of a graph expressing representative data and the approximation curve corresponding to the region of interest in FIG. 5.

The graph G3 shown in FIG. 9 is a graph corresponding to the graph G1 shown in FIG. 7 and is a graph expressing the approximation curve C1 and a plurality of pieces of representative data F1 on two-dimensional coordinates. The horizontal axis (X axis) in the graph G3 indicates the first pixel value, and the vertical axis (Y axis) in the graph G3 indicates the second pixel value. Each piece of the representative data F1 is a combination of the first representative value which is each of the first pixel values corresponding to the region R of interest (refer to FIG. 5) which has been correctly selected and the second representative value which is the average value of the second pixel values corresponding to the respective first pixel values.

Figure 10:
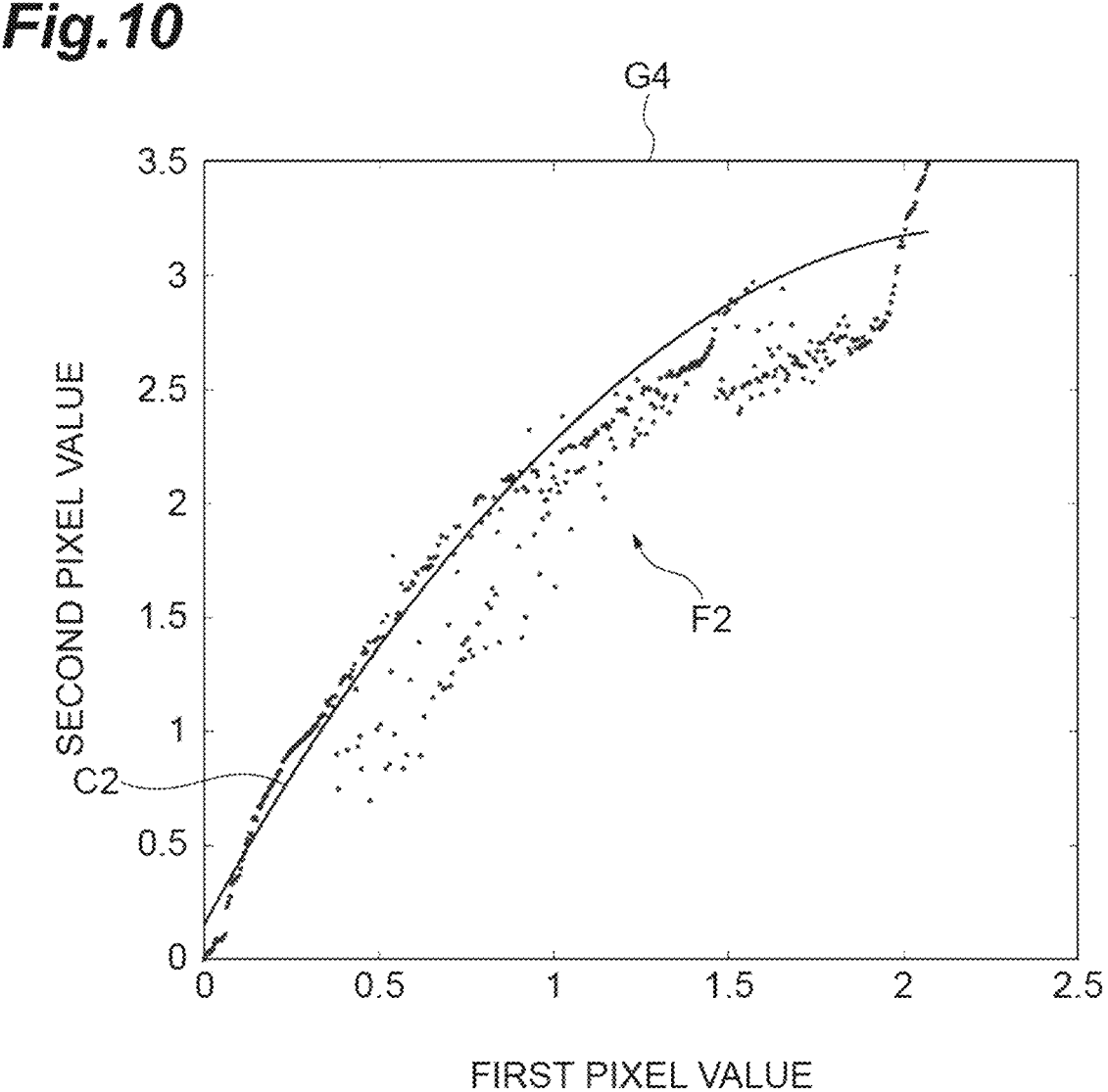
FIG. 10 is a view illustrating an example of a graph expressing representative data and the approximation curve corresponding to the region of interest in FIG. 6.

The graph G4 shown in FIG. 10 is a graph corresponding to the graph G2 shown in FIG. 8 and is a graph expressing the approximation curve C2 and a plurality of pieces of representative data F2 on two-dimensional coordinates. The horizontal axis (X axis) in the graph G4 indicates the first pixel value, and the vertical axis (Y axis) in the graph G4 indicates the second pixel value. The representative data F2 is a combination of the first representative value which is each of the first pixel values of the region R of interest (refer to FIG. 6) which is not correctly selected and the second representative value which is the average value of the second pixel values corresponding to the respective first pixel values.

The evaluation coefficient calculation portion 55 calculates an evaluation coefficient based on a correlation between the thickness correction function and the plurality of pieces of calculated representative data. In the present embodiment, an evaluation coefficient is a determination coefficient which is calculated on the basis of the thickness correction function and the representative data F1. The determination coefficient is calculated by subtracting a value obtained by dividing a residual variation of all pieces of the representative data F1 by total variations from 1. Thus, as the determination coefficient becomes closer to 1, the conformity increases. In the example in which the region of interest illustrated in FIG. 5 is correctly selected, the determination coefficient calculated on the basis of the thickness correction function and the representative data F1 (refer to FIG. 9) is 0.988. On the other hand, in the example in which the region of interest illustrated in FIG. 6 is not correctly selected, the determination coefficient calculated on the basis of the thickness correction coefficient and the representative data F2 (refer to FIG. 10) is 0.889. Namely, the conformity between the representative data F1 and the approximation curve C1 is higher than the conformity between the representative data F2 and the approximation curve C2, and when the region of interest is correctly selected, a high evaluation coefficient is calculated compared to when the region of interest is not correctly selected.

When the evaluation coefficient is equal to or smaller than a predetermined evaluation coefficient threshold, the notification portion 56 outputs error information related to an input of selection of the region of interest. The evaluation coefficient threshold is the lowermost limit value for the determination coefficient which is output when the region of interest is correctly selected and is a value which is set in advance. The evaluation coefficient threshold is set to 0.9, for example. As an example, the notification portion 56 outputs error information including at least either a character or a graphic indicating that a selection region is not correctly selected to the display included in the output device 105. In the example in which the region of interest illustrated in FIG. 5 is correctly selected, since the calculated determination coefficient is 0.988, the notification portion 56 judges that the evaluation coefficient is not equal to or smaller than the evaluation coefficient threshold and outputs no error information to the display. On the other hand, in the example in which the region of interest illustrated in FIG. 6 is not correctly selected, since the calculated determination coefficient is 0.889, the notification portion 56 judges that the evaluation coefficient is equal to or smaller than the evaluation coefficient threshold and outputs error information related to an input of selection of the region of interest to the display.

when the evaluation coefficient is equal to or smaller than a predetermined evaluation coefficient threshold, the selection reception portion 52 receives an input of selection of the region of interest different from the region of interest. Accordingly, for example, a user of the radiographic inspection apparatus 5 can reselect the region of interest on the display via the mouse or the like included in the input device 106.

The difference image generation portion 57 is a constituent element for realizing subtraction processing of eliminating an influence of the thickness of the article S, of the processing executed by the radiographic inspection apparatus 5. Hereinafter, together with description of functions of the difference image generation portion 57, an overview of subtraction processing of eliminating an influence of the thickness of the article S will be described.

When the notification portion 56 judges that the evaluation coefficient is not equal to or smaller than the evaluation coefficient threshold, the difference image generation portion 57 generates a difference image on the basis of the first image and the second image subjected to logarithmic conversion. A difference image is an image in which a region corresponding to a substance intended to be removed is removed. The difference image generation portion 57 generates a difference image by executing subtraction processing. Specifically, regarding subtraction processing, the difference image generation portion 57 subtracts a value calculated by applying the thickness correction function to each of the pixel values in the first image subjected to logarithmic conversion from each of the pixel values in the second image subjected to logarithmic conversion. Alternatively, the difference image generation portion 57 subtracts a value calculated by applying the thickness correction function to each of the pixel values in the second image subjected to logarithmic conversion from each of the pixel values in the first image subjected to logarithmic conversion. Alternatively, the difference image generation portion 57 subtracts each of the pixel values in the second image subjected to logarithmic conversion from a value calculated by applying the thickness correction function to each of the pixel values in the first image subjected to logarithmic conversion. Alternatively, the difference image generation portion 57 subtracts each of the pixel values in the first image subjected to logarithmic conversion from a value calculated by applying the thickness correction function to each of the pixel values in the second image subjected to logarithmic conversion. Accordingly, a difference image that is an image in which a substance corresponding to the region of interest in the first image or the second image has been removed is generated. Further, the difference image generation portion 57 outputs a difference image to the display (not illustrated) included in the output device 105.

Figure 11:
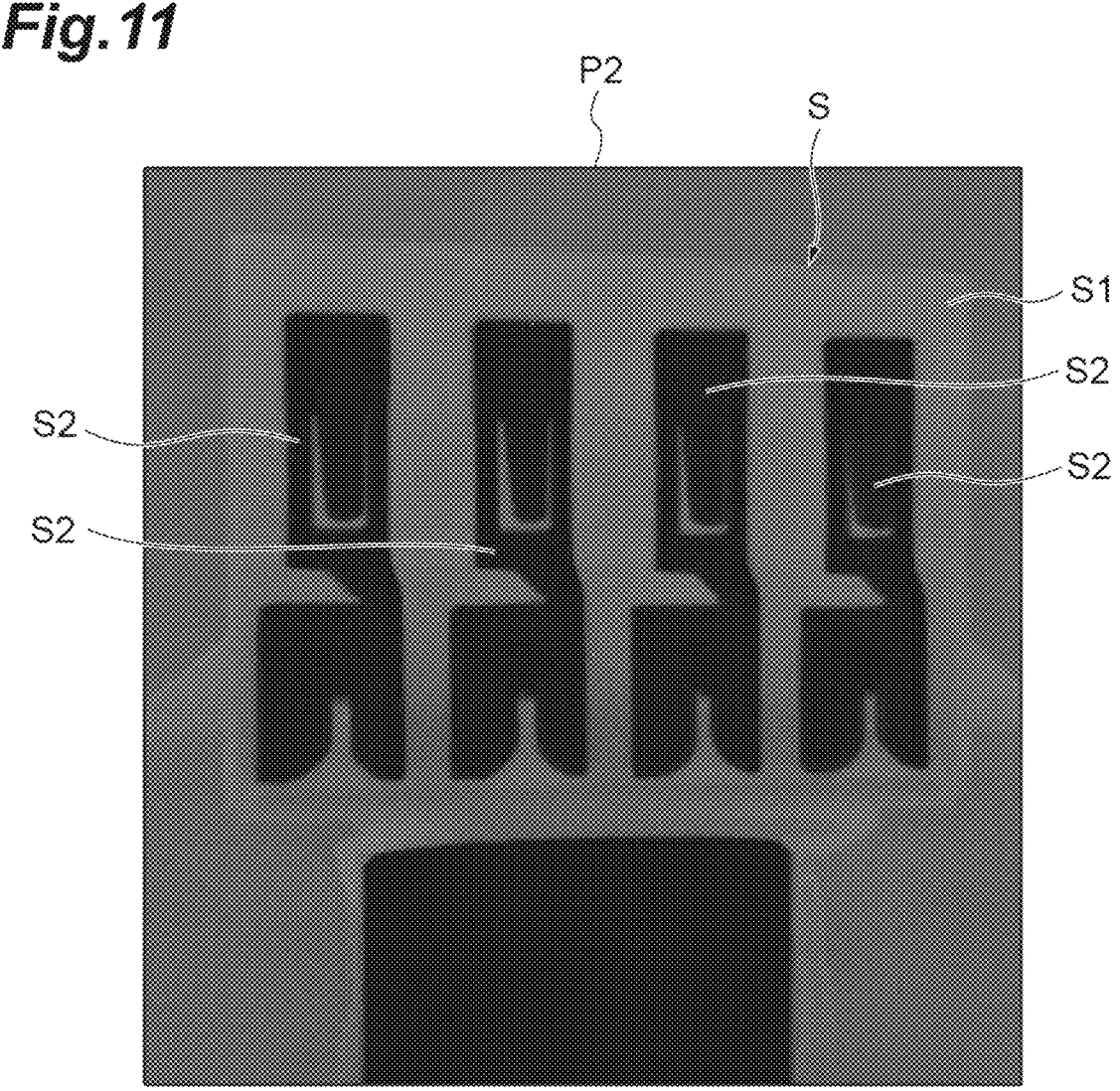
FIG. 11 is a view illustrating an example of a difference image corresponding to the region of interest in FIG. 5.
Figure 12:
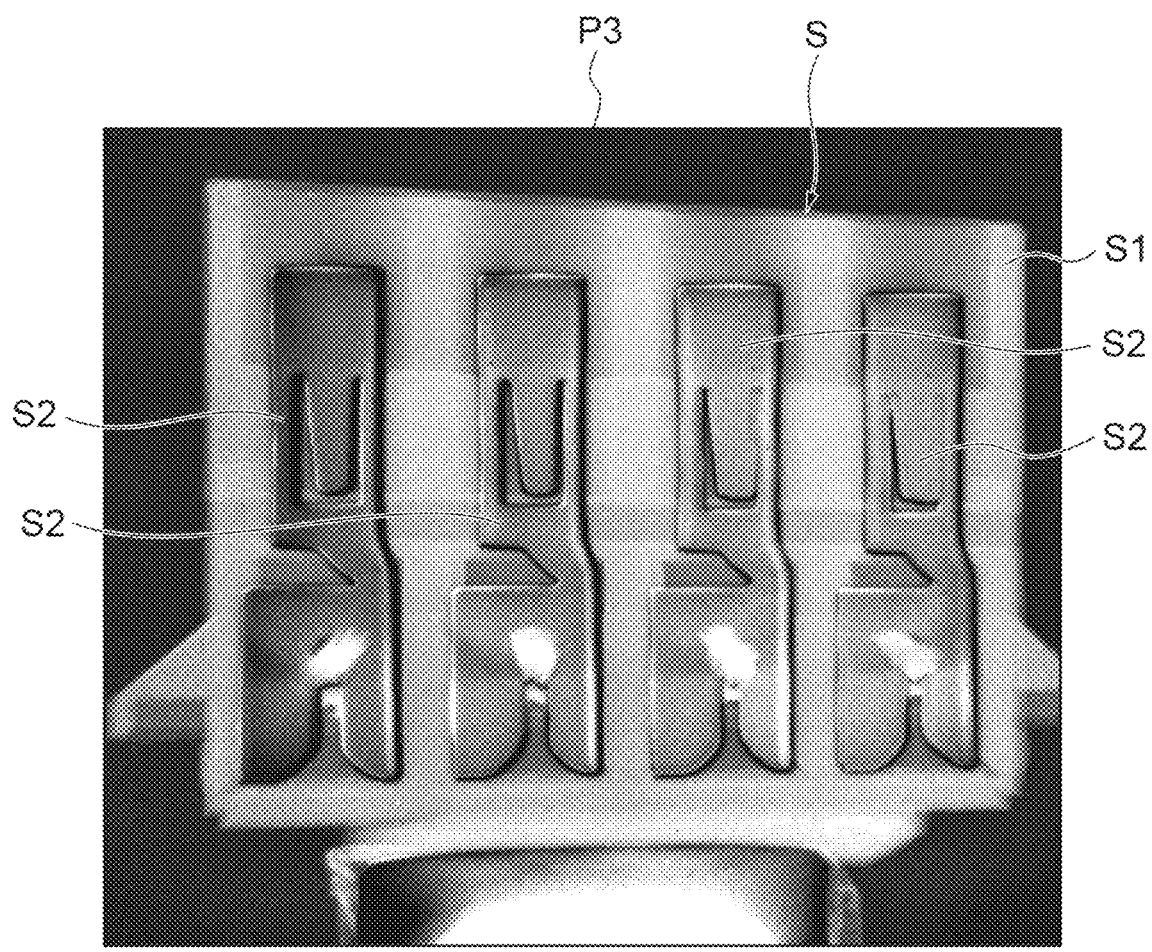
FIG. 12 is a view illustrating an example of a difference image corresponding to the region of interest in FIG. 6.

A difference image P2 illustrated in FIG. 11 is a difference image generated by the difference image generation portion 57 in the example in which the region R of interest is correctly selected (refer to FIGS. 5, 7, and 9). In the difference image P2, a part of the resin of the casing 51 is appropriately removed. On the other hand, a difference image P3 illustrated in FIG. 12 is a difference image generated when the difference image generation portion 57 executes processing of generating a difference image even if the evaluation coefficient is equal to or smaller than the evaluation coefficient threshold, for instance, in the example in which the region R of interest is not correctly selected (refer to FIGS. 6, 8, and 10). In the difference image P3, a part of the resin of the casing 51 is not appropriately removed.

The storage portion 58 stores the first image and the second image acquired by the acquisition portion 51, data indicating the region of interest input to the selection reception portion 52, the thickness correction function calculated by the thickness correction function calculation portion 53, the representative data calculated by the representative data calculation portion 54, the evaluation coefficient calculated by the evaluation coefficient calculation portion 55, a difference image generated by the difference image generation portion 57, and the like.

[Processing of Radiographic Inspection Apparatus]

Figure 13:
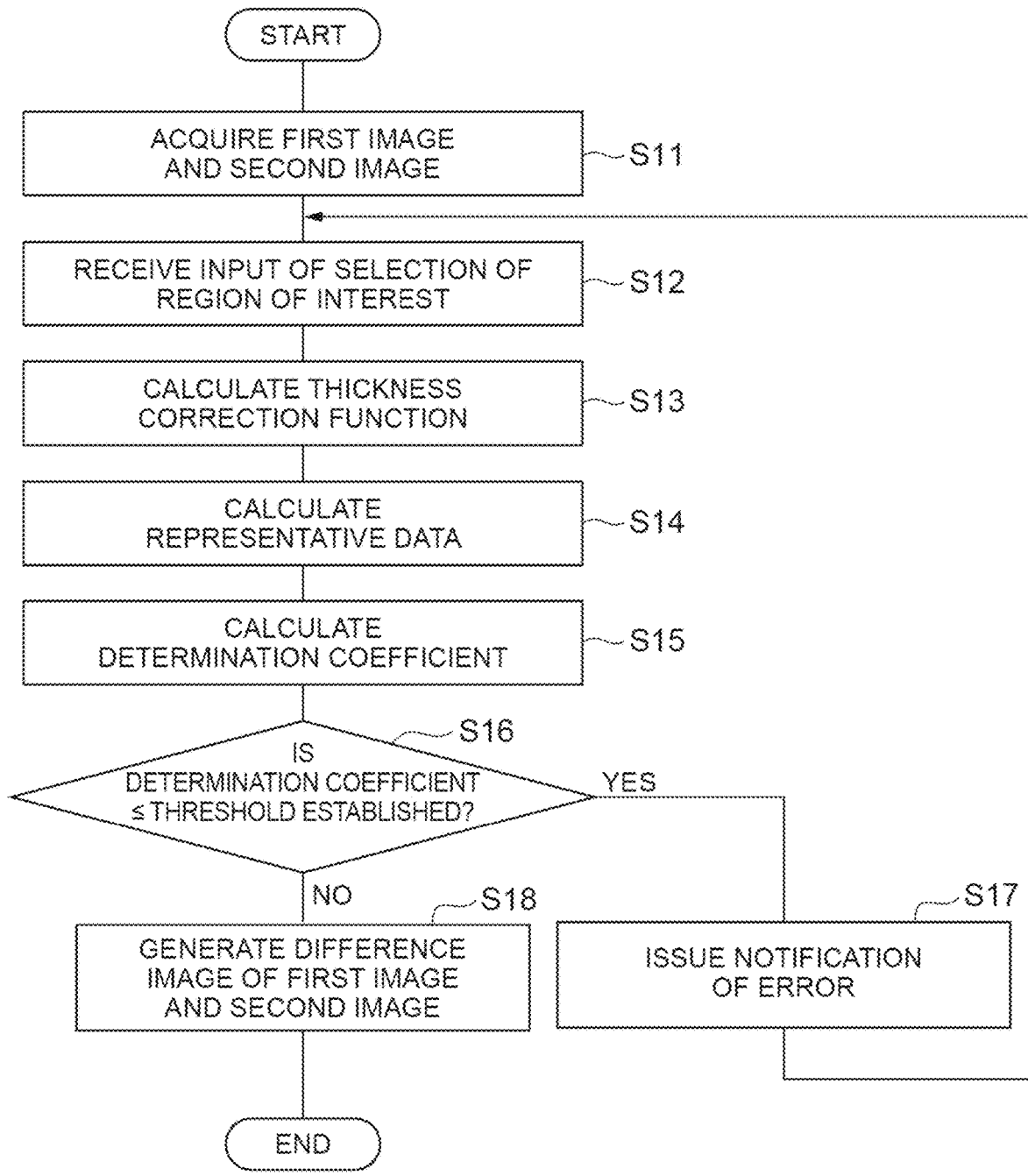
FIG. 13 is a flowchart showing operation of processing of a radiographic inspection method of the first embodiment.

Next, with reference to the flowchart in FIG. 13, a radiographic inspection method which is an operation method of the radiographic inspection apparatus 5 according to the present embodiment (processing executed by the radiographic inspection apparatus 5) will be described for each step of processing. FIG. 13 is a flowchart showing the radiographic inspection method according to the present embodiment. For example, processing executed by the radiographic inspection apparatus 5 is performed every time the article S is detected by the image acquiring apparatus 3.

First, in S11, the first image and the second image are acquired by the acquisition portion 51 from the image acquiring apparatus 3 (first step).

Next, in S12, an input of selection of the region of interest is received by the selection reception portion 52 (second step).

Next, in S13, a thickness correction function is calculated by the thickness correction function calculation portion 53

(third step). Specifically, first, respective first pixel values of a plurality of first pixels in a region corresponding to the region of interest in the first image subjected to logarithmic conversion and respective second pixel values of a plurality of second pixels corresponding to the plurality of first pixels in the second image subjected to logarithmic conversion are specified. Further, a coefficient of an approximation curve is calculated by approximating a plurality of sample points expressing the respective first pixel values of the plurality of first pixels and the respective second pixel values of the plurality of second pixels corresponding to the plurality of first pixels in a quadratic approximation curve on two-dimensional coordinates using a least squares method or the like. Accordingly, a thickness correction function which is a function for expressing the approximation curve is calculated.

Next, in S14, a plurality of pieces of representative data are calculated by the representative data calculation portion 54 on the basis of the respective first pixel values of the plurality of first pixels and the respective second pixel values of the plurality of second pixels corresponding to the plurality of first pixels (fourth step). The representative data is a combination of the first representative value and the second representative value. The representative data is calculated by the representative data calculation portion 54 when one first pixel value is regarded as the first representative value and the average value of one or a plurality of second pixel values corresponding to the one first pixel value is regarded as the second representative value.

Next, in S15, an evaluation coefficient based on a correlation between the thickness correction function and the plurality of pieces of calculated representative data is calculated by the evaluation coefficient calculation portion 55 (fifth step). In the present embodiment, the evaluation coefficient is a determination coefficient which is calculated on the basis of the thickness correction function and the plurality of pieces of calculated representative data.

Next, in S16, whether or not the evaluation coefficient is equal to or smaller than the evaluation coefficient threshold is judged by the notification portion 56. When it is judged that the evaluation coefficient is equal to or smaller than the evaluation coefficient threshold (S16: YES), in S17, error information related to an input of selection of the region of interest is output to the display of the output device 105 by the notification portion 56 (sixth step), and the processing returns to S12. Further, in S12, an input of selection of the region of interest different from the region of interest selected in S12 of the previous processing is received by the selection reception portion 52 (seventh step).

On the other hand, when it is judged that the evaluation coefficient is not equal to or smaller than the evaluation coefficient threshold (S16: NO), in S18, a difference image in which a substance corresponding to the region of interest in the first image or the second image is removed is generated by the difference image generation portion 57, and a difference image is displayed in the display of the output device 105. Further, radiographic inspection processing targeted at the article S ends.

[Operations and Effects]

According to the radiographic inspection apparatus 5 described above, an input of selection of the region of interest is received in the first image or the second image, and the respective first pixel values of the plurality of first pixels in the region corresponding to the region of interest in the first image subjected to logarithmic conversion and the respective second pixel values of the plurality of second pixels corresponding to the plurality of first pixels in the second image subjected to logarithmic conversion are specified. Further, the thickness correction function is calculated by approximating a relationship between the first pixel values and the second pixel values corresponding to the first pixel values, and a plurality of pieces of representative data which are combinations of the first representative value which is a representative value of the first pixel values and the second representative value which is a representative value of the second pixel values are calculated. Further, the evaluation coefficient is calculated on the basis of the correlation between the thickness correction function and the plurality of pieces of representative data. Accordingly, it is possible to evaluate whether or not the region of interest corresponds to a single substance on the basis of the evaluation coefficient. Thus, according to the present embodiment, it is possible to evaluate whether or not a region of interest has been appropriately selected.

Particularly, in the radiographic inspection apparatus 5, the first image and the second image are subjected to logarithmic conversion by the thickness correction function calculation portion 53, and the representative data which is a combination of the first representative value which is a representative pixel value of the first image subjected to logarithmic conversion and the second representative value which is a representative pixel value of the second image subjected to logarithmic conversion is calculated by the representative data calculation portion 54. Accordingly, the thickness correction function for expressing a relationship between the first pixel value and the second pixel value can be more appropriately calculated.

In the first embodiment, the thickness correction function calculation portion 53 calculates a thickness correction function in the third step by approximating a plurality of sample points expressing the respective first pixel values of the plurality of first pixels and the respective second pixel values of the plurality of second pixels corresponding to the plurality of first pixels on two-dimensional coordinates. Accordingly, the thickness correction function can be reliably calculated.

In the first embodiment, the thickness correction function calculation portion 53 calculates a coefficient of the approximation curve in the third step by approximating a plurality of sample points on two-dimensional coordinates using an Nth-order approximation curve. Accordingly, since a thickness correction function for accurately expressing a correspondence between the first pixel value and the second pixel value corresponding to the first pixel value can be calculated, an evaluation coefficient having high reliability can be calculated.

In the first embodiment, the representative data calculation portion 54 calculates representative data in the fourth step by setting one first pixel value as the first representative value and setting the average value of one or a plurality of second pixel values corresponding to the one first pixel value as the second representative value. The first pixel value and the second pixel value may be not only a pixel value corresponding to the pixel of a substance in which an influence of the thickness is intended to be eliminated but also a pixel value corresponding to the pixel having noise included in the first image and the second image. In the first embodiment, since an influence of noise on calculation of the evaluation coefficient can be curbed by obtaining the average value of one or a plurality of first pixel values or second pixel values, the evaluation coefficient can be accurately calculated.

In the first embodiment, the evaluation coefficient is a determination coefficient. Accordingly, an evaluation coefficient having high reliability can be calculated.

In the first embodiment, the notification portion 56 outputs error information related to an input of selection of the region of interest in the sixth step when the evaluation coefficient is equal to or smaller than a predetermined evaluation coefficient threshold. Accordingly, a user can be prompted to appropriately reselect the region of interest.

In the first embodiment, when the evaluation coefficient is equal to or smaller than a predetermined evaluation coefficient threshold, the selection reception portion 52 receives, in the seventh step, an input of selection of the region of interest different from the region of interest selected in the previous processing of reception of selection.

Accordingly, since a user can reselect the region of interest corresponding to a single substance, it is possible to acquire an image in which an image of a substance corresponding to the region of interest is appropriately removed.

Second Embodiment

[Constitution of Radiographic Inspection Apparatus]

Next, the radiographic inspection apparatus 5 of a second embodiment will be described. In the second embodiment, the notification portion 56 included in the radiographic inspection apparatus 5 performs the following processing as processing of outputting error information to the display included in the output device 105. That is, when the evaluation coefficient is equal to or smaller than a predetermined evaluation coefficient threshold, the notification portion 56 superimposes a non-corresponding region on the first image or the second image and outputs a result thereof as the error information. A non-corresponding region is a region not corresponding to a substance in which an influence of the thickness is eliminated in the first image or the second image. For example, the notification portion 56 displays a non-corresponding region selected due to an erroneous operation or the like of a user in the region of interest in the first image or the second image.

Hereinafter, a functional constitution of the notification portion 56 will be described using an example in which approximation is performed in a quadratic approximation curve on two-dimensional coordinates having the first pixel value as the X axis and having the second pixel value as the Y axis. First, the notification portion 56 outputs error information when the evaluation coefficient is equal to or smaller than the evaluation coefficient threshold. Further, the notification portion 56 calculates an error distance which is a distance between a pixel value estimated from the approximation curve and an actual pixel value (a pixel value in each of the sample points).

Here, a method of calculating an error distance will be described. First, the notification portion 56 specifies a differential value between the second pixel value corresponding to the first pixel value and the actual second pixel value corresponding to the first pixel value using the thickness correction function in the respective first pixel values of the plurality of first pixels. Specifically, regarding one first pixel value, the notification portion 56 calculates a differential value between the second pixel value estimated from the approximation curve (a value of y in $y=ax^2+bx+c$ which is an expression for the approximation curve) and the actual second pixel value corresponding to the one first pixel value. Further, the notification portion 56 calculates an error distance between the second pixel value estimated from the approximation curve and the actual second pixel value by squaring the differential value and adopting a square root.

Further, the notification portion 56 distinguishes a non-corresponding region not corresponding to a substance in which an influence of the thickness is eliminated in the first image or the second image on the basis of the error distance. Specifically, the notification portion 56 distinguishes whether or not a pixel corresponding to the one first pixel value (and a pixel of the second pixel value corresponding to the one first pixel value) corresponds to a substance in which an influence of the thickness is eliminated by comparing the error distance and an error threshold. The notification portion 56 performs processing from calculation of the differential value to judgment on whether or not it corresponds to a substance in which an influence of the thickness is eliminated with respect to all the first pixel values. When the second pixel value is regarded as the X axis and the first pixel value is regarded as the Y axis, an error distance between the first pixel value estimated from the approximation curve and the actual first pixel value may be calculated regarding one second pixel value.

As the differential value between the second pixel value based on estimation of the approximation curve and the actual second pixel value becomes smaller, a probability that a pixel corresponding to one first pixel value (and the second pixel value corresponding to the one first pixel value) corresponds to a substance in which an influence of the thickness is eliminated increases, and as it becomes larger, a probability that the pixel corresponds to a substance in which an influence of the thickness is eliminated decreases. The error threshold is a threshold for distinguishing whether or not the differential value is a value indicating a pixel corresponding to a substance in which an influence of the thickness is eliminated. The error threshold is a value set in advance and is calculated by the following method, for example. First, before starting radiographic inspection of the article S, such as at the time of starting the radiographic inspection apparatus 5, the first image or the second image of the article S is imaged by the acquisition portion 51. Further, an input of selection of the region of interest is received by the selection reception portion 52. At this time, in the first image or the second image, a region of interest intentionally including a region corresponding to a substance in which an influence of the thickness is eliminated and a non-corresponding region is selected by a user. Further, an error threshold is determined by a user such that only the error distance in the pixel corresponding to the non-corresponding region is distinguished. For example, regarding a method of determining an error threshold, first, an arbitrary candidate threshold which is a candidate of the error threshold is input to the computer system 20 by a user via the input device 106. Further, image information (details will be described below) based on a comparison between the error distance in each of the first pixel values and the candidate threshold is displayed in the display. When the image information including not only the non-corresponding region but also the region corresponding to a substance in which an influence of the thickness is eliminated is displayed, the candidate threshold is input again by a user, and the foregoing processing is repeated. When the image information having only the region not corresponding to a substance in which an influence of the thickness is eliminated as the non-corresponding region is displayed, the candidate threshold is determined as the error threshold by a user. Accordingly, an appropriate candidate threshold is determined as the error threshold.

Figure 14:
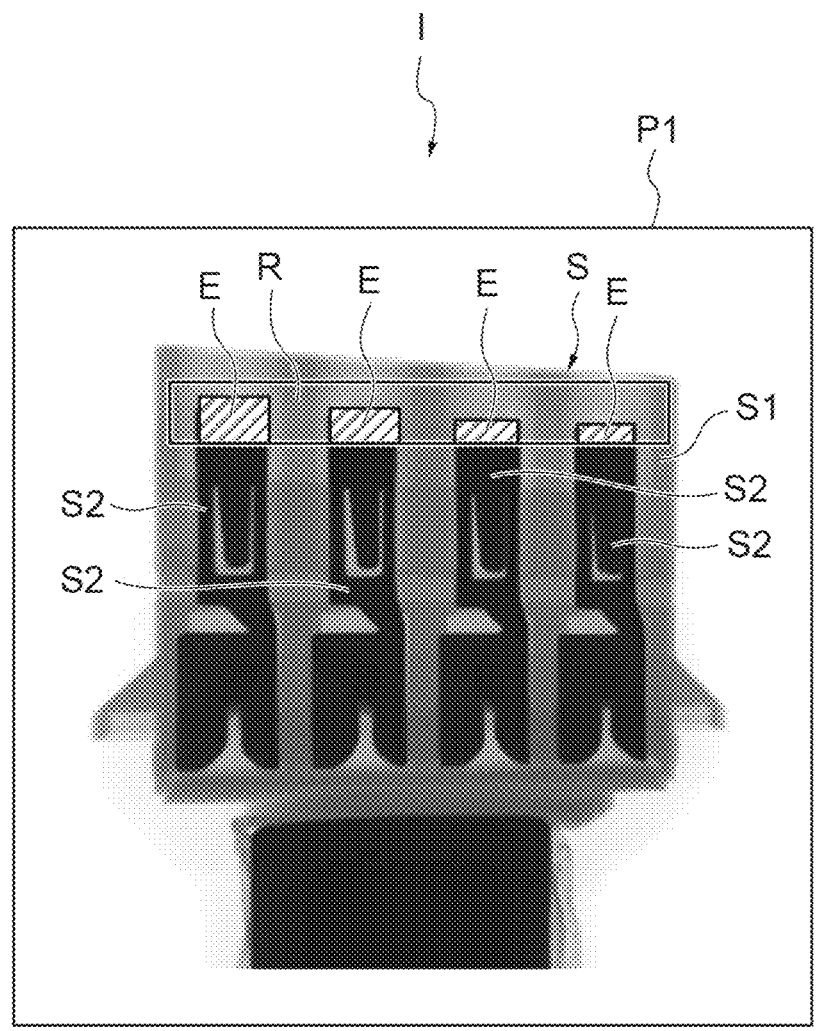
FIG. 14 is a view illustrating an example of image information output in a second embodiment.

Further, as the error information, the notification portion 56 outputs the image information indicating the non-corresponding region which is superimposed on the first image or the second image and is a region not corresponding to a substance in which an influence of the thickness is eliminated in the first image or the second image. Specifically, the notification portion 56 displays the pixel corresponding to the error distance in a manner of being superimposed on the first image or the second image. Image information (error information) I illustrated in FIG. 14 is an example in which a non-corresponding region E is superimposed on the image P1 (refer to FIGS. 5 and 6) which is the first image. In the example illustrated in FIG. 14, the region corresponding to the resin of the casing 51 (the substance in which an influence of the thickness is eliminated) in the image P1 and the region not corresponding to the resin (the region corresponding to the terminals S2 in FIG. 14) is selected as the region of interest. Therefore, the image information I in which a part of the terminals S2 which is a region not corresponding to a substance in which an influence of the thickness is eliminated in the selection region is displayed in the image P1 as the non-corresponding region E is displayed in the display. Examples of a display form of the non-corresponding region E include a region in which oblique lines are drawn with a red frame and a solid-filled region in red.

[Processing of Radiographic Inspection Apparatus]

Figure 15:
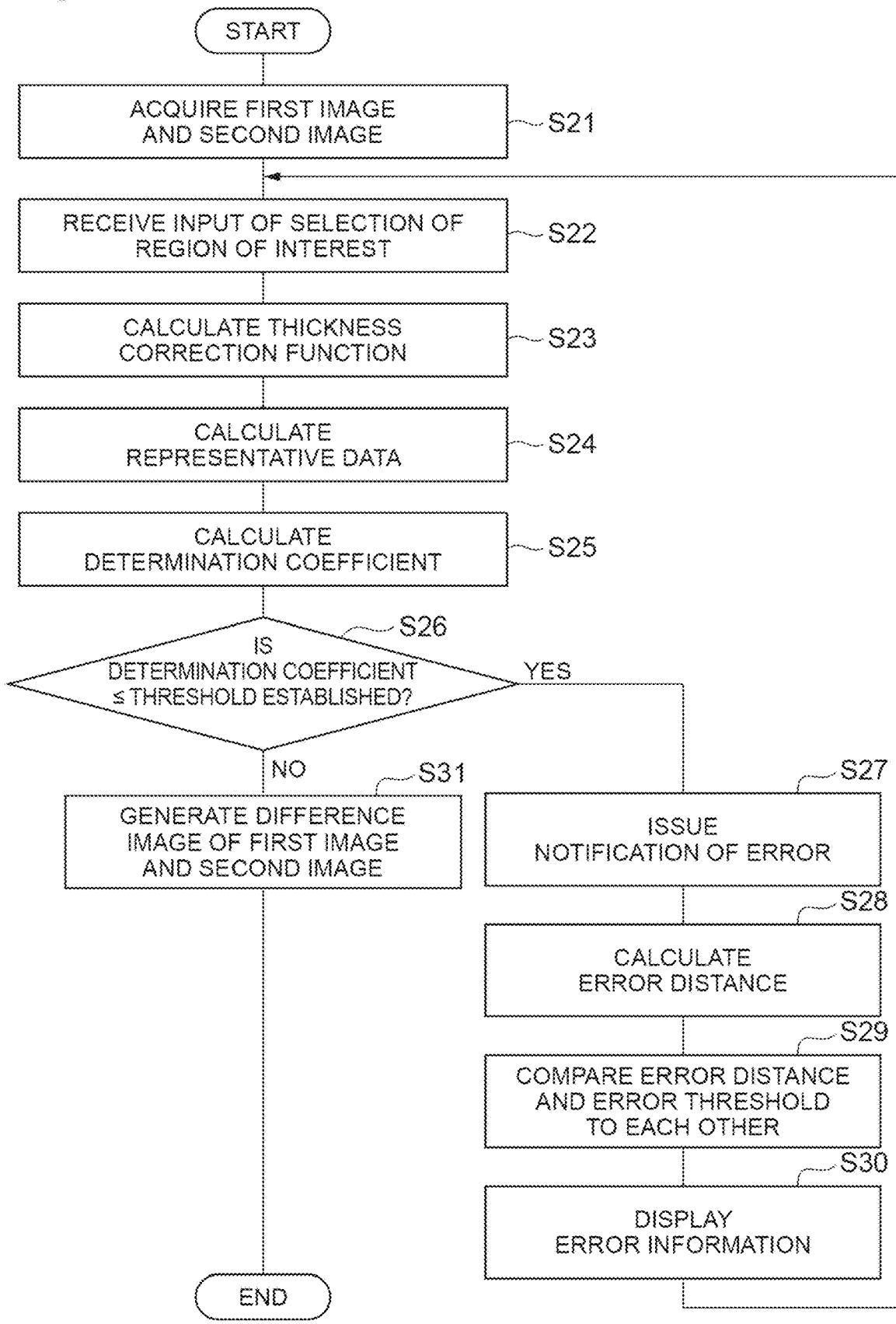
FIG. 15 is a flowchart showing operation of processing of the radiographic inspection method of the second embodiment.

Next, with reference to the flowchart in FIG. 15, a radiographic inspection method which is an operation method of the radiographic inspection apparatus 5 according to the present embodiment (processing executed by the radiographic inspection apparatus 5) will be described for each step of processing. FIG. 15 is a flowchart showing the radiographic inspection method according to the present embodiment.

Processing of S21 to S27 is similar to the processing of S11 to S17 illustrated in FIG. 13. After the processing of S21 to S27, in S28, an error distance between the second pixel value calculated using the thickness correction function (in other words, estimated from the approximation curve) and the actual second pixel value is calculated in each of the first pixel values by the notification portion 56 (sixth step). Next, in S29, the error distance in each of the first pixel values and the error threshold are compared to each other by the notification portion 56. Accordingly, the pixel corresponding to the error distance larger than the error threshold is distinguished as the non-corresponding region not corresponding to a substance in which an influence of the thickness is eliminated (sixth step). Next, in S30, the image information indicating the non-corresponding region superimposed on the first image or the second image is displayed (output) as the error information by the notification portion 56, and the processing returns to S22 (sixth step). Processing of S31 is similar to the processing of S18 illustrated in FIG. 13. The processing of notification of occurrence of an error (S27) and the processing of displaying the image information (S30) may be performed at the same time. That is, in the radiographic inspection method, notification of occurrence of an error and displaying of the image information may be performed at the same time.

[Operations and Effects]

The radiographic inspection apparatus 5 of the second embodiment described above exhibits effects similar to those of the first embodiment described above. In addition, in the sixth step, in the radiographic inspection apparatus 5 of the second embodiment, the error distance which is a distance between the second pixel value corresponding to the first pixel value and the actual second pixel value corresponding to the first pixel value and is calculated using the thickness correction function in the respective first pixel values of the plurality of first pixels is calculated. The non-corresponding region which is a region not corresponding to a substance in which an influence of the thickness is eliminated in the first image or the second image is distinguished on the basis of the error distance. Regarding the error information, the first image or the second image on which the non-corresponding region is superimposed is output. Accordingly, it can be easy for a user to select an appropriate region of interest. That is, in the radiographic inspection apparatus 5 of the second embodiment, it is possible to support a user such that an appropriate region of interest is reselected by displaying not only occurrence of an error but also the image information described above in the display.

Third Embodiment

[Constitution of Radiographic Inspection Apparatus]

Next, the radiographic inspection apparatus 5 of a third embodiment will be described. In the third embodiment, the thickness correction function calculation portion 53 included in the radiographic inspection apparatus 5 performs the following processing. That is, the thickness correction function calculation portion 53 calculates a thickness correction function by curbing an influence of an outlier on a plurality of sample points expressing respective first pixel values of the plurality of first pixels and respective second pixel values of the plurality of second pixels corresponding to the plurality of first pixels and approximating the plurality of sample points on two-dimensional coordinates.

Specifically, in the present embodiment, the thickness correction function calculation portion 53 calculates a thickness correction function by performing an M estimation method of a robust estimation method. First, an approximation curve is estimated by the thickness correction function calculation portion 53 approximating a plurality of sample points on two-dimensional coordinates using a least squares method or the like. Further, the thickness correction function calculation portion 53 recalculates an approximation curve by performing weighting in accordance with the distance between the second pixel value estimated by the approximation curve and the actual second pixel value in each of the first pixel values. Specifically, the thickness correction function calculation portion 53 reduces the weighting as the distance between the second pixel value estimated by the approximation curve and the actual second pixel value increases. The thickness correction function calculation portion 53 repeats processing from the weighting to recalculation of the approximation curve a plurality of times. Accordingly, an influence of an outlier on the plurality of sample points is curbed, the approximation curve is determined, and the thickness correction function which is a function for expressing the approximation curve is calculated.

[Processing of Radiographic Inspection Apparatus]

Figure 16:
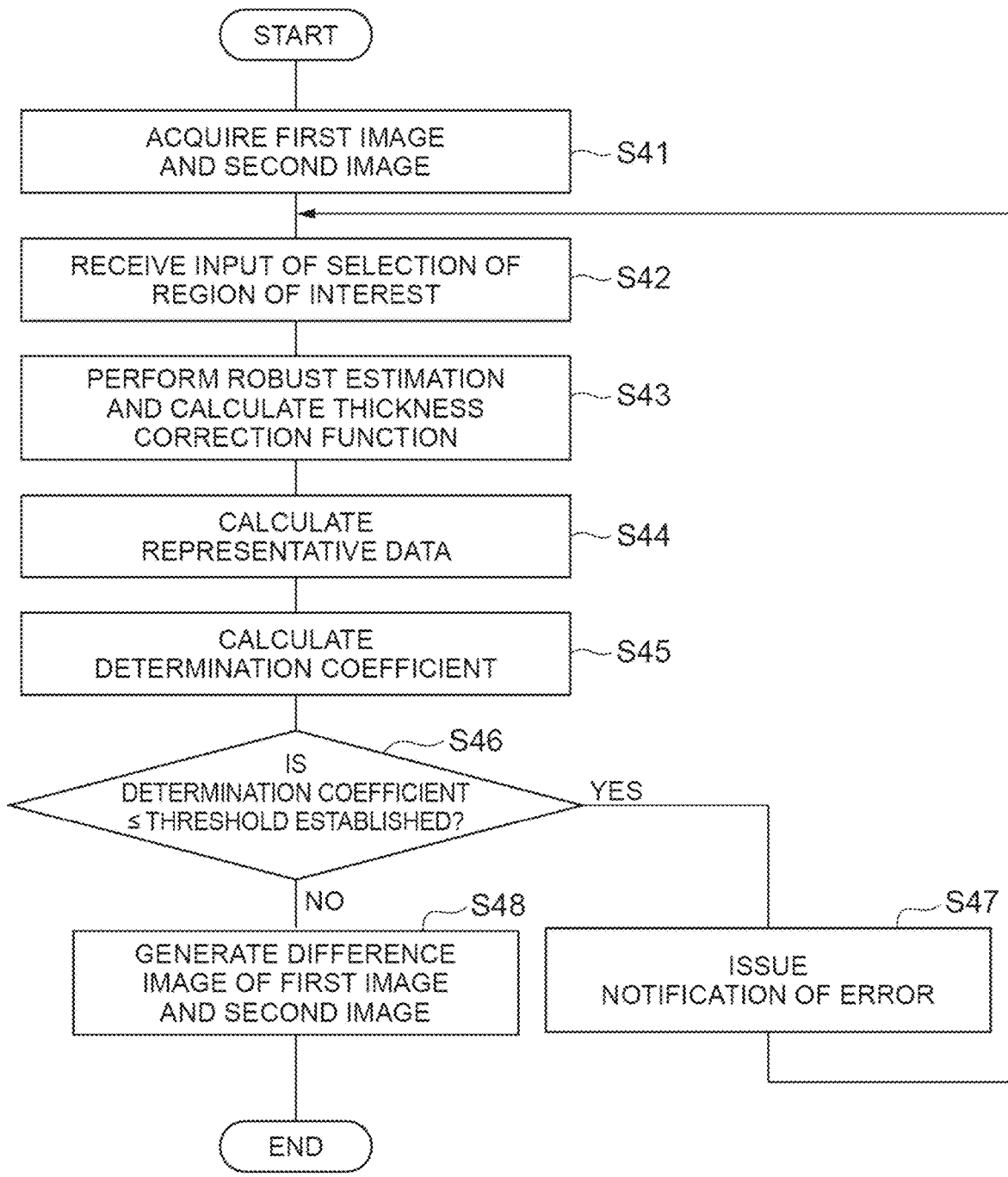
FIG. 16 is a flowchart showing operation of processing of the radiographic inspection method of a third embodiment.

Next, with reference to the flowchart in FIG. 16, a radiographic inspection method which is an operation method of the radiographic inspection apparatus 5 according to the present embodiment (processing executed by the radiographic inspection apparatus 5) will be described for each step of processing. FIG. 16 is a flowchart showing the radiographic inspection method according to the present embodiment.

Processing of S41 and S42 is similar to the processing of S11 and S12 illustrated in FIG. 13. After the processing of S41 and S42, in S43, the thickness correction function is calculated by the thickness correction function calculation portion 53 curbing an influence of an outlier in the plurality of sample points and approximating the plurality of sample points on two-dimensional coordinates (third step). Specifically, the approximation curve is determined by the thickness correction function calculation portion 53 repeating calculation of the approximation curve a plurality of times by a weighting least squares method using the M estimation method of the robust estimation method described above. Accordingly, the thickness correction function which is a function for expressing an approximation curve is calculated. Processing of S44 to S48 is similar to the processing of S14 to S18 illustrated in FIG. 13.

[Operations and Effects]

The radiographic inspection apparatus 5 of the third embodiment described above exhibits effects similar to those of the first embodiment described above. In addition, in the radiographic inspection apparatus 5 of the third embodiment, in the third step, the thickness correction function is calculated by curbing an influence of an outlier on a plurality of sample points expressing respective first pixel values of the plurality of first pixels and respective second pixel values of the plurality of second pixels corresponding to the plurality of first pixels and approximating the plurality of sample points on two-dimensional coordinates. Accordingly, since approximation of a plurality of sample points can be accurately performed, the evaluation coefficient can be accurately calculated.

Particularly, in the radiographic inspection apparatus 5 of the third embodiment, regarding a technique of curbing an influence of an outlier in a plurality of sample points, M estimation of robust estimation is used. Accordingly, highly accurate approximation of a plurality of sample points can be reliably performed.

Modification Example

The present disclosure is not limited to each of the embodiments described above. For example, an approximation curve of approximating a plurality of sample points is not limited to a quadratic approximation curve. For example, the thickness correction function calculation portion 53 need only approximate a plurality of sample points in an Nth-order (N is a natural number of 1 or larger) approximation curve on two-dimensional coordinates. That is, an approximation curve of approximating a plurality of sample points may be a cubic approximation curve or a higher-order approximation curve. Accordingly, since a thickness correction function for accurately expressing a correspondence between the first pixel value and the second pixel value corresponding to the first pixel value can be calculated, an evaluation coefficient having high reliability can be calculated. In addition, approximation of a plurality of sample points may be performed by a primary approximation straight line.

Here, an example of a result of correction processing targeted at the article S which is food performed by the radiographic inspection apparatus 5 of the first embodiment will be described.

Figure 17:
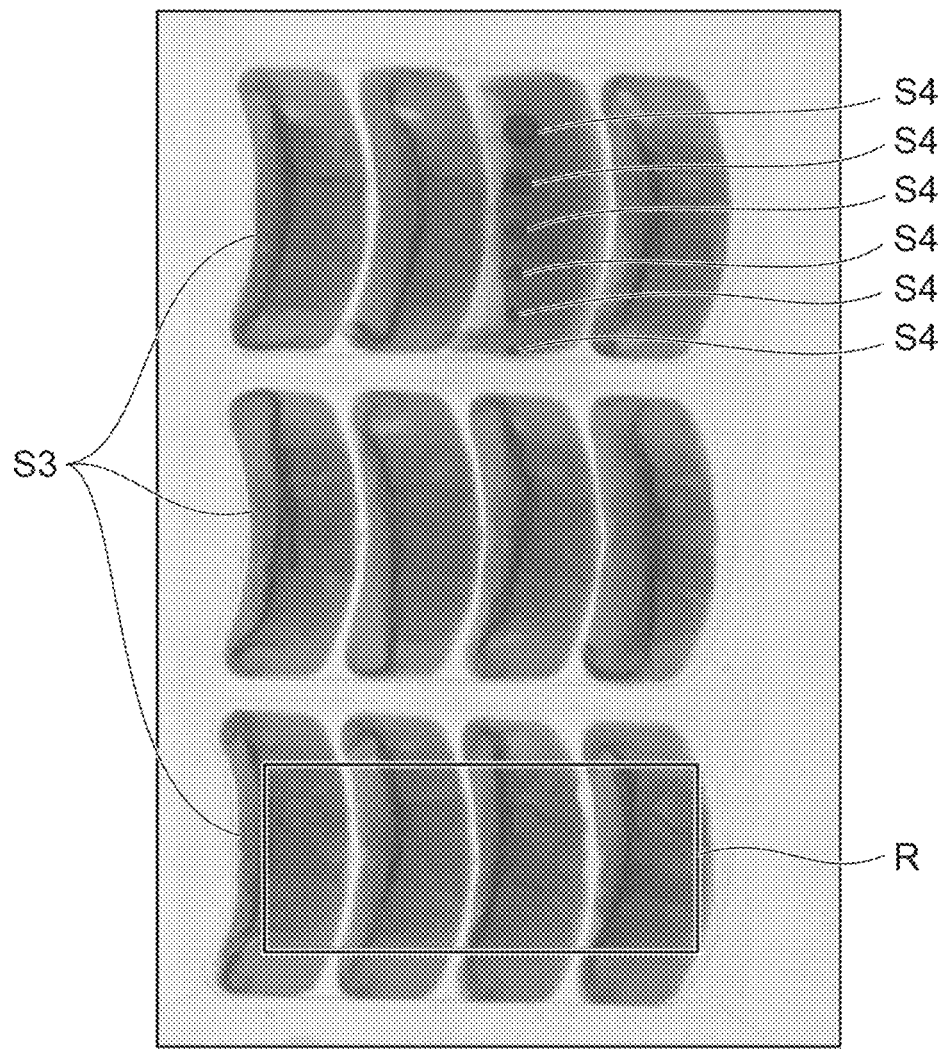
FIG. 17 is a view illustrating an example of a first image acquired by the radiographic inspection apparatus of the first embodiment.
Figure 18:
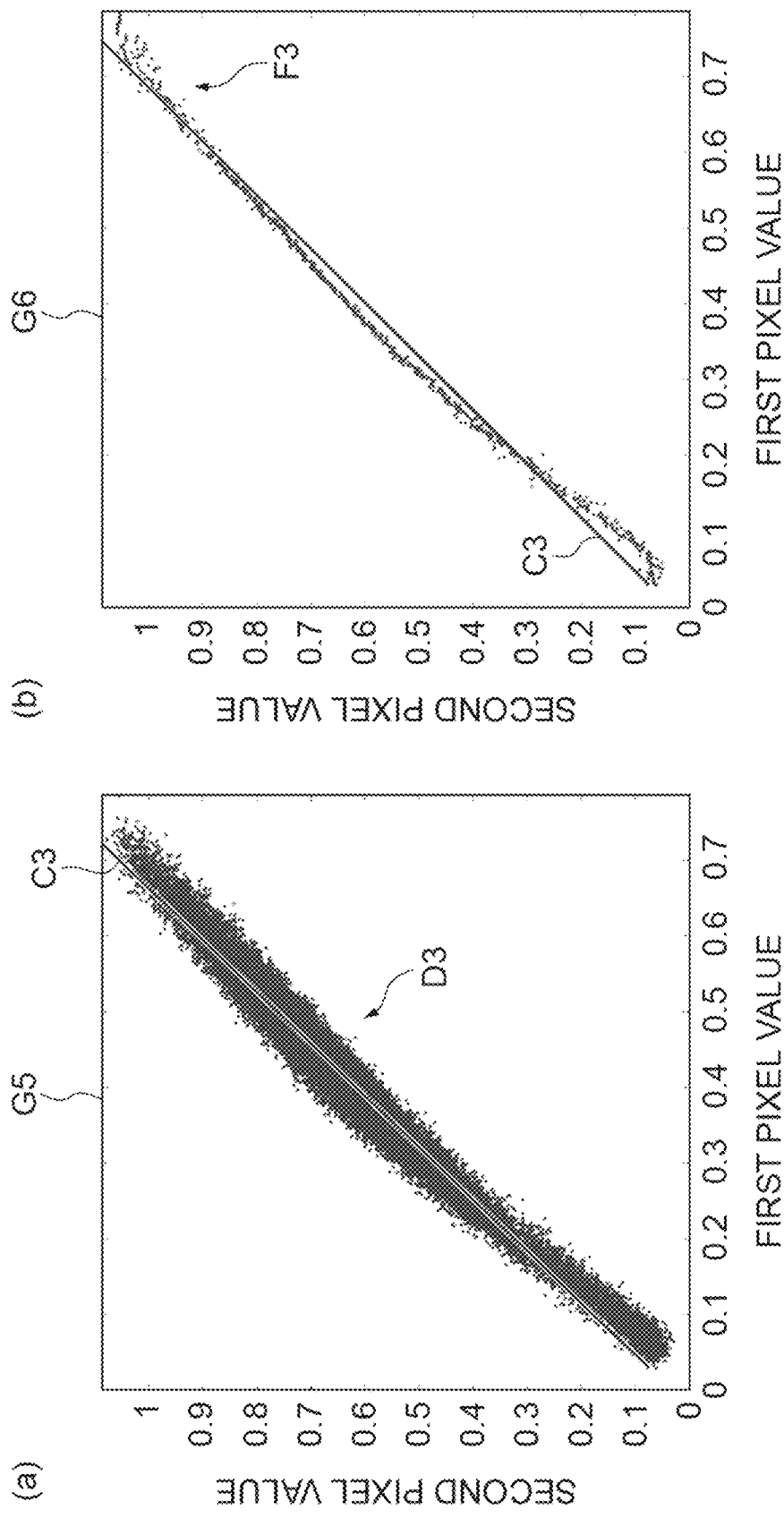
FIG. 18 shows graphs of approximation curves calculated through primary approximation by the radiographic inspection apparatus.
Figure 19:
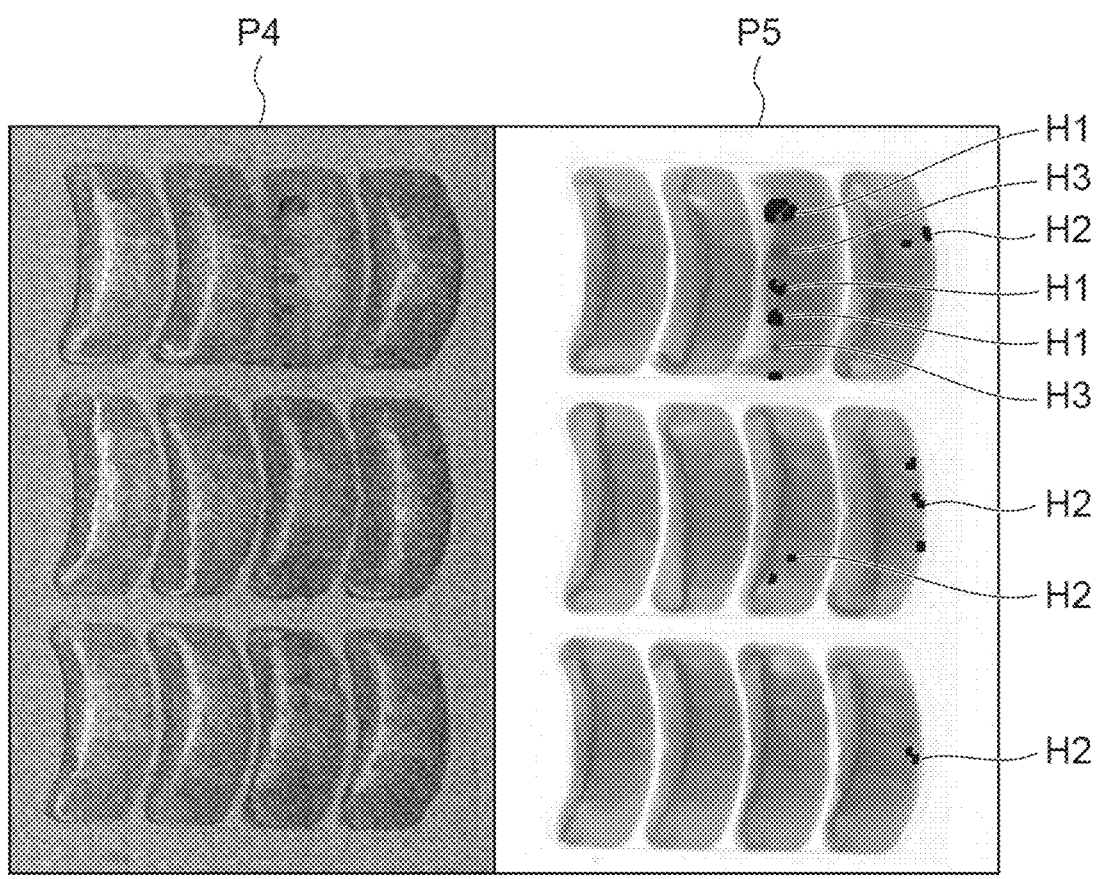
FIG. 19 is a view showing a subtraction image generated by the radiographic inspection apparatus and an image of foreign matter detection results in which the subtraction image has been subjected to threshold processing.

FIG. 17 shows an example of the first image of the article S. In the article S (processing target), a plurality of aluminum pieces S4 are included in a part of a plurality of dumplings S3 arranged side by side. FIG. 18 shows graphs of an approximation curve C3. The approximation curve C3 is a curve which is calculated through primary approximation by the radiographic inspection apparatus 5 when the region R of interest is selected in a region including the dumplings S3 which include no aluminum pieces S4 on the first image shown in FIG. 17. Specifically, in FIG. 18, the (a) part shows a graph G5 indicating the approximation curve C3 together with sample points D3, and the (b) part shows a graph G6 indicating the approximation curve C3 together with representative data F3. In this case, the calculated determination coefficient was 0.990, which was a large value to a certain degree. In addition, FIG. 19 shows a difference image P4 which is generated by the radiographic inspection apparatus 5 in this case and a foreign matter detection result image P5 which is obtained by performing threshold processing of the difference image. In this manner, in the difference image P4 and the result image P5, an influence of the thickness of parts of the dumplings S3 could be eliminated to a certain degree and locations H1 of the aluminum pieces S4 could be detected. However, locations H2 which were erroneously detected and locations H3 which had to be basically detected but could not be able to be detected were generated. Particularly, thick parts of the dumplings S3 appeared white in the difference image P4, and there was a tendency that the parts could not be completely eliminated.

Figure 20:
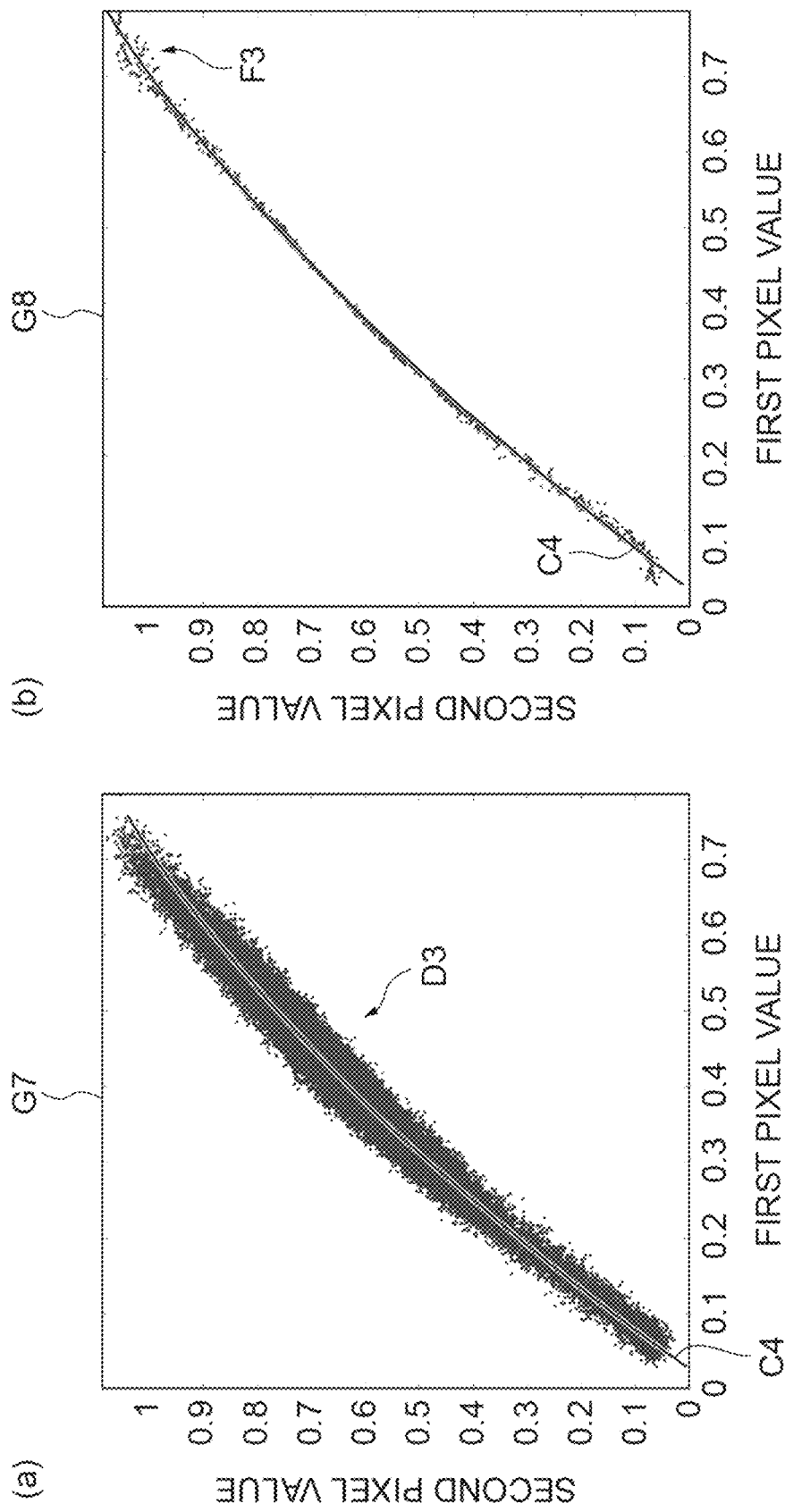
FIG. 20 shows graphs of approximation curves calculated through quadratic approximation by the radiographic inspection apparatus.
Figure 21:
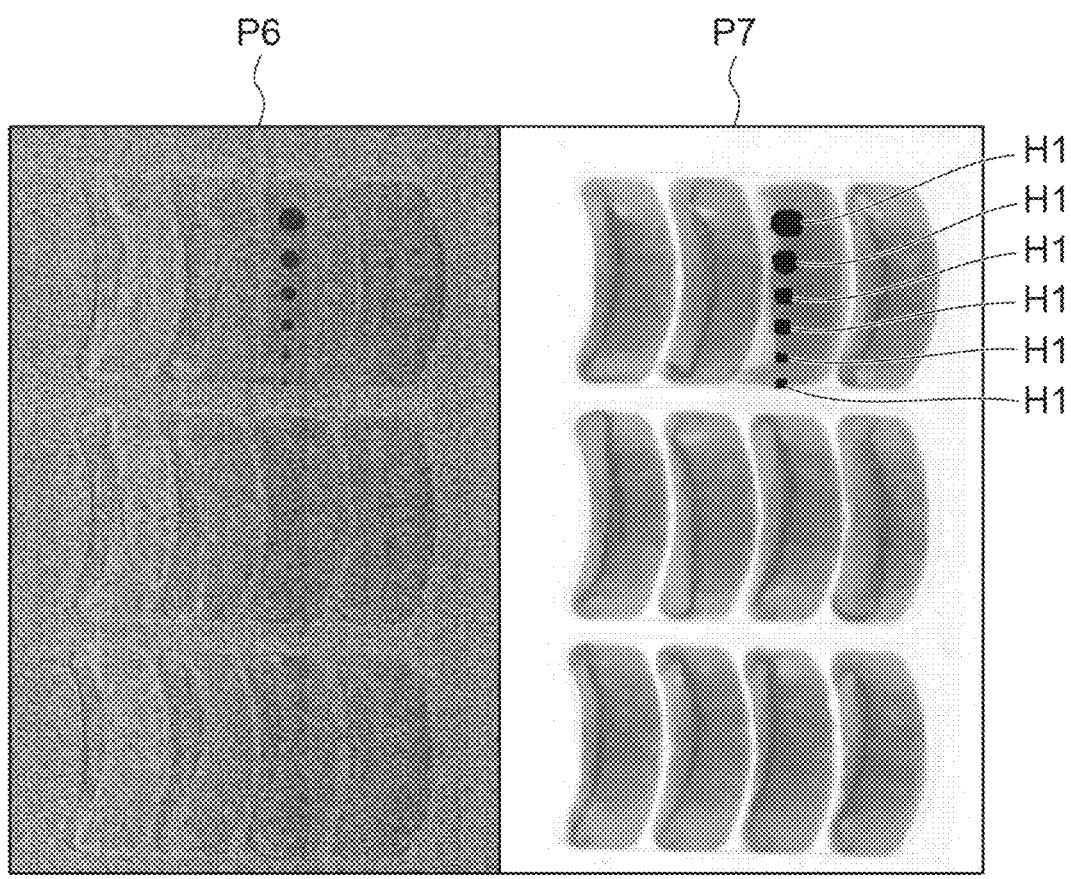
FIG. 21 is a view showing a subtraction image generated by the radiographic inspection apparatus and an image of foreign matter detection results in which the subtraction image has been subjected to threshold processing.

FIG. 20 shows graphs of an approximation curve C4. The approximation curve C4 is a curve which is calculated through quadratic approximation by the radiographic inspection apparatus 5 when the region R of interest is selected in a region including the dumplings S3 which include no aluminum pieces S4 on the first image shown in FIG. 17. Specifically, in FIG. 20, the (a) part shows a graph G7 indicating the approximation curve C4 together with the sample points D3, and the (b) part shows a graph G8 indicating the approximation curve C4 together with the representative data F3. In this case, the calculated determination coefficient was 0.998, which was a larger value than that in a case of primary approximation. In addition, FIG. 21 shows a difference image P6 which is generated by the radiographic inspection apparatus 5 in this case and a foreign matter detection result image P7 which is obtained by performing threshold processing of the difference image. In this manner, in the difference image P6 and the result image P7, an influence of the thickness of parts of the dumplings S3 could be entirely eliminated in diverse luminance, and all the locations H1 of the aluminum pieces S4 could be detected.

According to these results, it became clear that, depending on the type of the article S, an influence of the thickness could be more completely eliminated in the difference image by quadratic approximation than by primary approximation.

Figure 22:
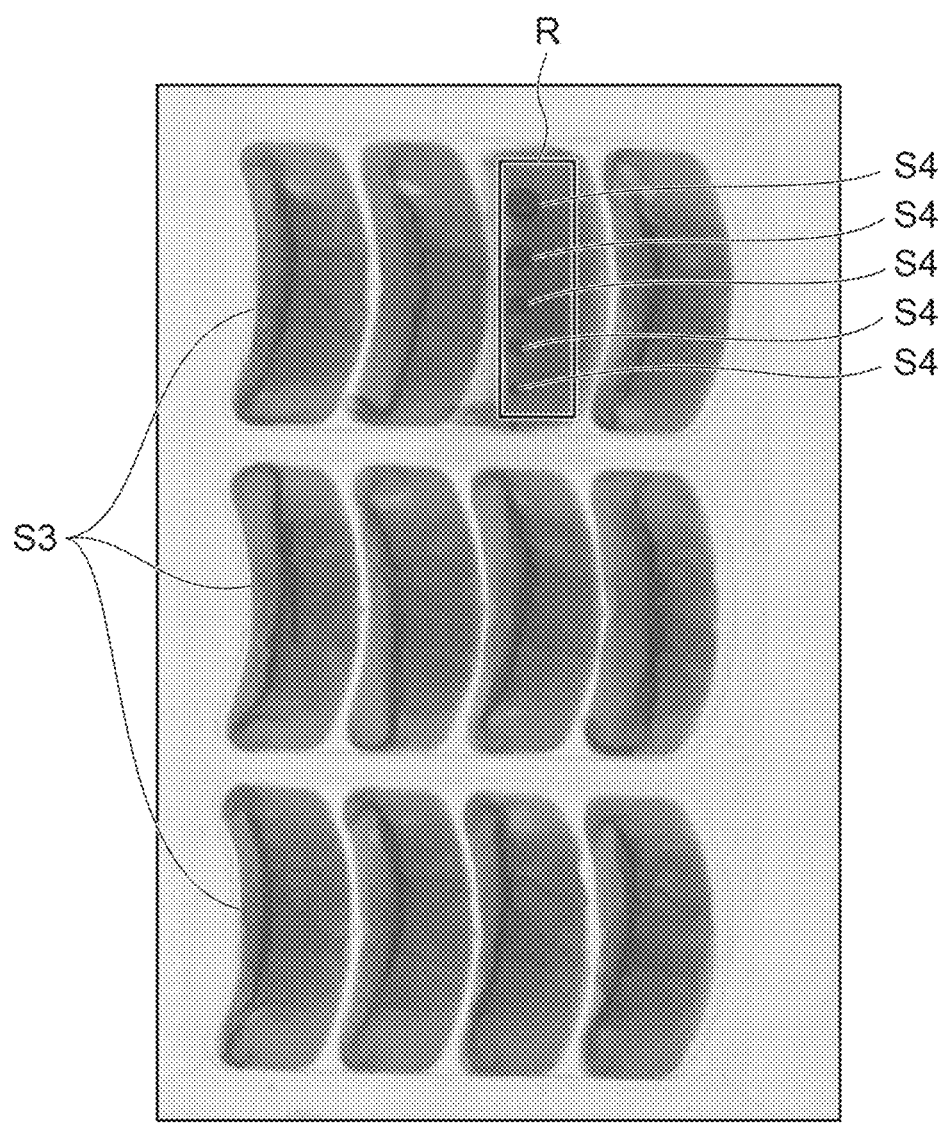
FIG. 22 is a view illustrating another example of the first image acquired by the radiographic inspection apparatus of the first embodiment.
Figure 23:
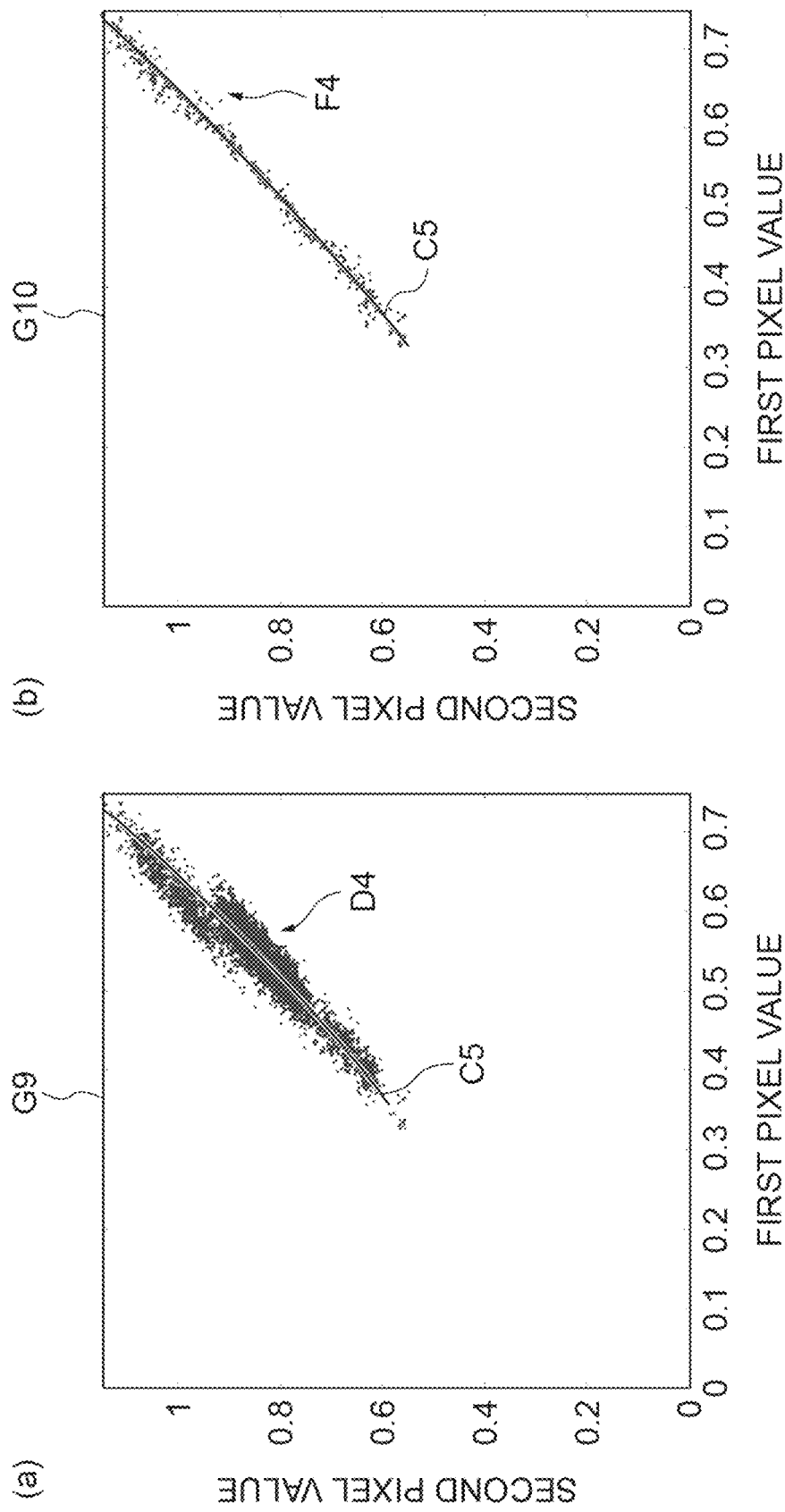
FIG. 23 shows graphs of approximation curves calculated through quadratic approximation by the radiographic inspection apparatus.
Figure 24:
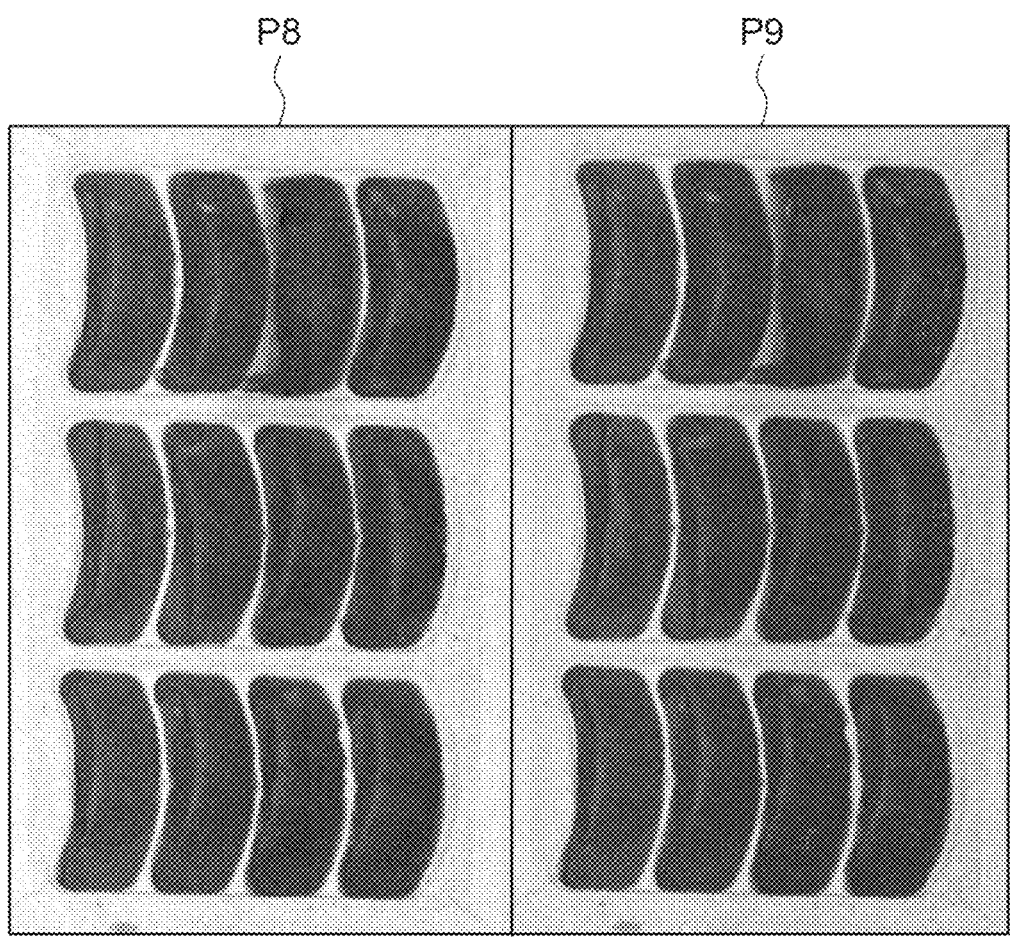
FIG. 24 is a view showing a subtraction image generated by the radiographic inspection apparatus and an image of foreign matter detection results in which the subtraction image has been subjected to threshold processing.

In addition, FIG. 22 shows a case in which a region including the aluminum pieces S4 is erroneously selected as the region R of interest on the first image of the article S which is the same as that in FIG. 17. FIG. 23 shows graphs of an approximation curve C5 calculated through quadratic approximation by the radiographic inspection apparatus 5 in this case. Specifically, in FIG. 23, the (a) part shows a graph G9 indicating the approximation curve C5 together with sample points D4, and the (b) part shows a graph G10 indicating the approximation curve C5 together with representative data F4. In this case, the calculated determination coefficient was 0.988, which was a comparatively small value with respect to the determination coefficient 0.998 when a region was appropriately selected because the region R of interest was not appropriate. In addition, FIG. 24 shows a difference image P8 which is generated by the radiographic inspection apparatus 5 in this case and a foreign matter detection result image P9 which is obtained by performing threshold processing of the difference image. In this manner, in the difference image P8 and the result image P9, a difference image is generated while the dumplings S3 and the aluminum pieces S4 have the same luminance, and it is ascertained that the aluminum pieces S4 cannot be detected. A threshold of the determination coefficient differs depending on a target, and it is desirable to change the threshold of the determination coefficient depending on an inspection target. However, a method of determining a threshold is as described above.

In addition, in each of the embodiments described above, the first image and the second image were subjected to logarithmic conversion by the thickness correction function calculation portion 53, and the representative data which was a combination of the first representative value which was the representative pixel value of the first image subjected to logarithmic conversion and the second representative value which was the representative pixel value of the second image subjected to logarithmic conversion was calculated by the representative data calculation portion 54. However, the first image and the second image may not be subjected to logarithmic conversion.

In addition, in each of the embodiments described above, for example, a relationship between the first pixel value and the second pixel value corresponding to the first pixel value may be calculated on the basis of a look up table (LUT).

In addition, for example, the evaluation coefficient may be a correlation coefficient. According to this as well, an evaluation coefficient having high reliability can be calculated.

In addition, for example, the representative data may be calculated while one second pixel value is regarded as the second representative value and the average value of one or a plurality of first pixel values corresponding to the one second pixel value is regarded as the first representative value.

In addition, for example, the representative data may be calculated while one first pixel value is regarded as the first representative value and the median value of one or a plurality of second pixel values corresponding to the one first pixel value is regarded as the second representative value, or while one second pixel value is regarded as the second representative value and the median value of one or a plurality of first pixel values corresponding to the one second pixel value is regarded as the first representative value. Since an influence of noise on calculation of the evaluation coefficient can be curbed even by obtaining the median value of one or a plurality of first pixel values or second pixel values, the evaluation coefficient can be accurately calculated.

In addition, the error information displayed by the notification portion 56 is not limited to the form of each of the embodiments described above. In addition, in the radiographic inspection apparatus 5, error information related to an input of selection of the region of interest may not be output.

In addition, processing may be performed by other methods of robust estimation. Examples of other methods of robust estimation include RANSAC and a Least Median of Squares method.

In addition, each step of the processing shown in the flowcharts (FIGS. 13, 15 and 16) of each of the radiographic inspection methods described above may be suitably omitted. In addition, an order of the steps of the processing may be suitably switched.

In the method and the apparatus according to the embodiments described above, the first pixel value may be a pixel value for each of a plurality of first pixels in a region corresponding to the region of interest in the first image subjected to logarithmic conversion, the second pixel value may be a pixel value for each of a plurality of second pixels corresponding to the plurality of first pixels in the second image subjected to logarithmic conversion, and each of the plurality of pieces of representative data may be a combination of the first representative value which is a representative pixel value of the first image subjected to logarithmic conversion and the second representative value which is a representative pixel value of the second image subjected to logarithmic conversion. Accordingly, the thickness correction function for expressing a relationship between the first pixel value and the second pixel value can be more appropriately calculated.

In the foregoing method and apparatus, a thickness correction function may be calculated by approximating a plurality of sample points expressing the respective first pixel values of the plurality of first pixels and the respective second pixel values of the plurality of second pixels corresponding to the plurality of first pixels on two-dimensional coordinates. Accordingly, the thickness correction function can be reliably calculated.

In the foregoing method and apparatus, a coefficient of the approximation curve may be calculated by approximating a plurality of sample points on two-dimensional coordinates using an Nth-order (N is a natural number of 1 or larger) approximation curve. Accordingly, since a thickness correction function for accurately expressing a correspondence between the first pixel value and the second pixel value corresponding to the first pixel value can be calculated, an evaluation coefficient having high reliability can be calculated.

In the foregoing method and apparatus, each of the plurality of pieces of representative data may be calculated by setting one first pixel value as the first representative value and setting the average value of one or a plurality of second pixel values corresponding to the one first pixel value as the second representative value, or by setting one second pixel value as the second representative value and setting the average value of one or a plurality of first pixel values corresponding to the one second pixel value as the first representative value. The first pixel value and the second pixel value may be not only a pixel value corresponding to the pixel of a substance in which an influence of the thickness is intended to be eliminated but also a pixel value corresponding to the pixel having noise included in the first image and the second image. In the foregoing method and apparatus, since an influence of noise on calculation of the evaluation coefficient can be curbed by obtaining the average value of one or a plurality of first pixel values or second pixel values, the evaluation coefficient can be accurately calculated.

In the foregoing method and apparatus, each of the plurality of pieces of representative data may be calculated by setting one first pixel value as the first representative value and setting the median value of one or a plurality of second pixel values corresponding to the one first pixel value as the second representative value, or by setting one second pixel value as the second representative value and setting the median value of one or a plurality of first pixel values corresponding to the one second pixel value as the first representative value. The first pixel value and the second pixel value may be not only a pixel value corresponding to the pixel of a substance in which an influence of the thickness is intended to be eliminated but also a pixel value corresponding to the pixel having noise included in the first image and the second image. In the foregoing method and apparatus, since an influence of noise on calculation of the evaluation coefficient can be curbed by obtaining the median value of one or a plurality of first pixel values or second pixel values, the evaluation coefficient can be accurately calculated.

In the foregoing method and apparatus, the evaluation coefficient may be a determination coefficient. Accordingly, an evaluation coefficient having high reliability can be calculated.

In the foregoing method and apparatus, the evaluation coefficient may be a correlation coefficient. Accordingly, an evaluation coefficient having high reliability can be calculated.

In the foregoing method and apparatus, error information related to an input of selection of the region of interest may be output when the evaluation coefficient is equal to or smaller than a predetermined evaluation coefficient threshold. Accordingly, a user can be prompted to appropriately reselect the region of interest.

In the foregoing method and apparatus, the error distance which is a distance between the second pixel value calculated using the thickness correction function and corresponding to the first pixel value and the actual second pixel value corresponding to the first pixel value in the respective first pixel values of the plurality of first pixels may be calculated. The non-corresponding region which is a region not corresponding to a substance in which an influence of the thickness is eliminated in the first image or the second image may be distinguished on the basis of the error distance. Regarding the error information, the first image or the second image on which the non-corresponding region is superimposed may be output. Accordingly, it can be easy for a user to select an appropriate region of interest.

In the foregoing method and apparatus, when the evaluation coefficient is equal to or smaller than a predetermined evaluation coefficient threshold, an input of selection of the region of interest different from the region of interest may be received. Accordingly, since a user can reselect the region of interest corresponding to a single substance, it is possible to acquire an image in which an image of a substance corresponding to the region of interest is appropriately removed.

In the foregoing method and apparatus, the thickness correction function may be calculated by curbing an influence of an outlier on a plurality of sample points expressing respective first pixel values of the plurality of first pixels and respective second pixel values of the plurality of second pixels corresponding to the plurality of first pixels and approximating the plurality of sample points on two-dimensional coordinates. Accordingly, since approximation of a plurality of sample points can be accurately performed, the evaluation coefficient can be accurately calculated.

REFERENCE SIGNS LIST

1 Radiographic inspection system
2 Irradiator (radiation source)
3 Image acquiring apparatus (detector)
5 Radiographic inspection apparatus
20 Computer system
101 CPU (processor)
C1, C2 Approximation curve
D1, D2 Sample points
E Non-corresponding region
I Image information (error information)
P1 First image, second image
R Region of interest
S Article
F1, F2 Representative data

The invention claimed is:

1. A radiographic inspection method comprising:

acquiring a first image in which an article is imaged in a state of being irradiated with a radiation having a first energy distribution, and a second image in which the article is imaged in a state of being irradiated with a radiation having a second energy distribution different from the first energy distribution;

receiving an input of selection of a region of interest which is a region corresponding to a substance in which an influence of a thickness is eliminated in a region corresponding to the article in the first image or the second image;

specifying respective first pixel values of a plurality of first pixels in a region corresponding to the region of interest in the first image and respective second pixel values of a plurality of second pixels corresponding to the plurality of first pixels in the second image, and calculating a function for expressing a relationship between the first pixel values and the second pixel values which is a thickness correction function for eliminating an influence of the thickness of the substance by approximating a relationship between the first pixel values and the second pixel values corresponding to the first pixel values;

calculating a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels; and calculating an evaluation coefficient based on a correlation between the thickness correction function and the plurality of pieces of calculated representative data, wherein in calculating the plurality of pieces of representative data, each of the plurality of pieces of representative data is calculated by having one of the first pixel values as the first representative value and having a median value of one or a plurality of pixel values of the second pixel values corresponding to the one of the first pixel values as the second representative value, or by having one of the second pixel values as the second representative value and having a median value of one or a plurality of pixel values of the first pixel values corresponding to the one of the second pixel values as the first representative value.

2. The radiographic inspection method according to claim 1, wherein the first pixel values are respective pixel values of the plurality of first pixels in the region corresponding to the region of interest in the first image subjected to logarithmic conversion, wherein the second pixel values are respective pixel values of the plurality of second pixels corresponding to the plurality of first pixels in the second image subjected to logarithmic conversion, and wherein each of the plurality of pieces of representative data is a combination of the first representative value which is a representative pixel value of the first image subjected to logarithmic conversion and the second representative value which is a representative pixel value of the second image subjected to logarithmic conversion.

3. The radiographic inspection method according to claim 1, wherein in calculating the function, the thickness correction function is calculated by approximating a plurality of sample points expressing the respective first pixel values of the plurality of first pixels and the respective second pixel values of the plurality of second pixels corresponding to the plurality of first pixels on two-dimensional coordinates.

4. The radiographic inspection method according to claim 3, wherein in calculating the function, a coefficient of an Nth-order (N is a natural number of 1 or larger) approximation curve is calculated by approximating the plurality of sample points on the two-dimensional coordinates using the approximation curve.

5. The radiographic inspection method according to claim 1, wherein in calculating the plurality of pieces of representative data, each of the plurality of pieces of representative data is calculated
  by having one of the first pixel values as the first representative value and having an average value of one or a plurality of pixel values of the second pixel values corresponding to the one of the first pixel values as the second representative value, or
  by having one of the second pixel values as the second representative value and having an average value of one or a plurality of pixel values of the first pixel values corresponding to the one of the second pixel values as the first representative value.

6. The radiographic inspection method according to claim 1, wherein the evaluation coefficient is a determination coefficient.

7. The radiographic inspection method according to claim 1, wherein the evaluation coefficient is a correlation coefficient.

8. The radiographic inspection method according to claim 1 further comprising:
  outputting error information related to an input of selection of the region of interest when the evaluation coefficient is equal to or smaller than a predetermined evaluation coefficient threshold.

9. The radiographic inspection method according to claim 8, wherein in outputting error information,
  error distances which are distances between the second pixel values calculated using the thickness correction function and corresponding to the first pixel values and actual pixel values of the second pixel values corresponding to the first pixel values are calculated regarding the respective first pixel values of the plurality of first pixels,
  a non-corresponding region which is a region not corresponding to a substance in which an influence of the thickness is eliminated in the first image or the second image is distinguished on the basis of the error distance, and
  the first image or the second image on which the non-corresponding region has been superimposed is output as the error information.

10. The radiographic inspection method according to claim 1 further comprising:
  receiving an input of selection of a region of interest which is different from the region of interest when the evaluation coefficient is equal to or smaller than a predetermined evaluation coefficient threshold.

11. The radiographic inspection method according to claim 1, wherein in calculating the function, the thickness correction function is calculated by curbing an influence of an outlier on a plurality of sample points expressing the respective first pixel values of the plurality of first pixels and the respective second pixel values of the plurality of second pixels corresponding to the plurality of first pixels, and approximating the plurality of sample points on the two-dimensional coordinates.

12. A radiographic inspection apparatus comprising:
  at least one processor,
  wherein the at least one processor
  acquires a first image in which an article is imaged in a state of being irradiated with a radiation having a first energy distribution, and a second image in which the article is imaged in a state of being irradiated with a radiation having a second energy distribution different from the first energy distribution;
  receives an input of selection of a region of interest which is a region corresponding to a substance in which an influence of a thickness is eliminated in a region corresponding to the article in the first image or the second image;
  specifies respective first pixel values of a plurality of first pixels in a region corresponding to the region of interest in the first image and respective second pixel values of a plurality of second pixels corresponding to the plurality of first pixels in the second image, and calculates a function for expressing a relationship between the first pixel values and the second pixel values which is a thickness correction function for eliminating an influence of the thickness of the substance by approximating a relationship between the first pixel values and the second pixel values corresponding to the first pixel values;
  calculates a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels; and
  calculates an evaluation coefficient based on a correlation between the thickness correction function and the plurality of pieces of calculated representative data,
  wherein each of the plurality of pieces of representative data is calculated
  by having one of the first pixel values as the first representative value and having a median value of one or a plurality of pixel values of the second pixel values corresponding to the one of the first pixel values as the second representative value, or
  by having one of the second pixel values as the second representative value and having a median value of one or a plurality of pixel values of the first pixel values corresponding to the one of the second pixel values as the first representative value.

13. The radiographic inspection apparatus according to claim 12,
  wherein the first pixel values are respective pixel values of the plurality of first pixels in the region corresponding to the region of interest in the first image subjected to logarithmic conversion,
  wherein the second pixel values are respective pixel values of the plurality of second pixels corresponding to the plurality of first pixels in the second image subjected to logarithmic conversion, and wherein each of the plurality of pieces of representative data is a combination of the first representative value which is a representative pixel value of the first image subjected to logarithmic conversion and the second representative value which is a representative pixel value of the second image subjected to logarithmic conversion.

14. The radiographic inspection apparatus according to claim 12, wherein the at least one processor calculates the thickness correction function by approximating a plurality of sample points expressing the respective first pixel values of the plurality of first pixels and the respective second pixel values of the plurality of second pixels corresponding to the plurality of first pixels on two-dimensional coordinates.

15. The radiographic inspection apparatus according to claim 14, wherein the at least one processor calculates a coefficient of an Nth-order (N is a natural number of 1 or larger) approximation curve by approximating the plurality of sample points on the two-dimensional coordinates using the approximation curve.

16. The radiographic inspection apparatus according to claim 12, wherein each of the plurality of pieces of representative data is calculated
by having one of the first pixel values as the first representative value and having an average value of one or a plurality of pixel values of the second pixel values corresponding to the one of the first pixel values as the second representative value, or
by having one of the second pixel values as the second representative value and having an average value of one or a plurality of pixel values of the first pixel values corresponding to the one of the second pixel values as the first representative value.

17. The radiographic inspection apparatus according to claim 12, wherein the evaluation coefficient is a determination coefficient.

18. The radiographic inspection apparatus according to claim 12, wherein the evaluation coefficient is a correlation coefficient.

19. The radiographic inspection apparatus according to claim 12, wherein the at least one processor outputs error information related to an input of selection of the region of interest when the evaluation coefficient is equal to or smaller than a predetermined evaluation coefficient threshold.

20. The radiographic inspection apparatus according to claim 19, wherein the at least one processor
calculates error distances which are distances between the second pixel values calculated using the thickness correction function and corresponding to the first pixel values and actual pixel values of the second pixel values corresponding to the first pixel values regarding the respective first pixel values of the plurality of first pixels,
distinguishes a non-corresponding region which is a region not corresponding to a substance in which an influence of the thickness is eliminated in the first image or the second image on the basis of the error distance, and
outputs the first image or the second image on which the non-corresponding region has been superimposed, as the error information.

21. The radiographic inspection apparatus according to claim 12, wherein the at least one processor receives an input of selection of a region of interest which is different from the region of interest when the evaluation coefficient is equal to or smaller than a predetermined evaluation coefficient threshold.

22. The radiographic inspection apparatus according to claim 12, wherein the at least one processor calculates the thickness correction function by curbing an influence of an outlier on a plurality of sample points expressing the respective first pixel values of the plurality of first pixels, and the respective second pixel values of the plurality of second pixels corresponding to the plurality of first pixels, and approximating the plurality of sample points on the two-dimensional coordinates.

23. A radiographic inspection system comprising:
the radiographic inspection apparatus according to claim 12;
a radiation source configured to irradiate the article with a radiation having the first energy distribution and a radiation having the second energy distribution; and
a detector configured to detect a radiation with which irradiation is performed from the radiation source, which is transmitted through the article, and which has the first energy distribution, and a radiation with which irradiation is performed from the radiation source, which is transmitted through the article, and which has the second energy distribution.

24. A non-volatile storage medium including a radiographic inspection program for causing a computer to function as
acquiring a first image in which an article is imaged in a state of being irradiated with a radiation having a first energy distribution, and a second image in which the article is imaged in a state of being irradiated with a radiation having a second energy distribution different from the first energy distribution;
receiving an input of selection of a region of interest which is a region corresponding to a substance in which an influence of a thickness is eliminated in a region corresponding to the article in the first image or the second image;
specifying respective first pixel values of a plurality of first pixels in a region corresponding to the region of interest in the first image and respective second pixel values of a plurality of second pixels corresponding to the plurality of first pixels in the second image, and calculating a function for expressing a relationship between the first pixel values and the second pixel values which is a thickness correction function for eliminating an influence of the thickness of the substance by approximating a relationship between the first pixel values and the second pixel values corresponding to the first pixel values;
calculating a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels; and
calculating an evaluation coefficient based on a correlation between the thickness correction function and the plurality of pieces of calculated representative data,
wherein each of the plurality of pieces of representative data is calculated
by having one of the first pixel values as the first representative value and having a median value of one or a plurality of pixel values of the second pixel values corresponding to the one of the first pixel values as the second representative value, or by having one of the second pixel values as the second representative value and having a median value of one or a plurality of pixel values of the first pixel values corresponding to the one of the second pixel values as the first representative value.

25. A radiographic inspection method comprising:
acquiring a first image in which an article is imaged in a state of being irradiated with a radiation having a first energy distribution, and a second image in which the article is imaged in a state of being irradiated with a radiation having a second energy distribution different from the first energy distribution;
receiving an input of selection of a region of interest which is a region corresponding to a substance in which an influence of a thickness is eliminated in a region corresponding to the article in the first image or the second image;
specifying respective first pixel values of a plurality of first pixels in a region corresponding to the region of interest in the first image and respective second pixel values of a plurality of second pixels corresponding to the plurality of first pixels in the second image, and calculating a function for expressing a relationship between the first pixel values and the second pixel values which is a thickness correction function for eliminating an influence of the thickness of the substance by approximating a relationship between the first pixel values and the second pixel values corresponding to the first pixel values;
calculating a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels;
calculating an evaluation coefficient based on a correlation between the thickness correction function and the plurality of pieces of calculated representative data; and
outputting error information related to an input of selection of the region of interest when the evaluation coefficient is equal to or smaller than a predetermined evaluation coefficient threshold.

26. The radiographic inspection method according to claim 25, wherein in outputting error information,
error distances which are distances between the second pixel values calculated using the thickness correction function and corresponding to the first pixel values and actual pixel values of the second pixel values corresponding to the first pixel values are calculated regarding the respective first pixel values of the plurality of first pixels,
a non-corresponding region which is a region not corresponding to a substance in which an influence of the thickness is eliminated in the first image or the second image is distinguished on the basis of the error distance, and
the first image or the second image on which the non-corresponding region has been superimposed is output as the error information.

27. A radiographic inspection apparatus comprising:
at least one processor,
wherein the at least one processor
acquires a first image in which an article is imaged in a state of being irradiated with a radiation having a first energy distribution, and a second image in which the article is imaged in a state of being irradiated with a radiation having a second energy distribution different from the first energy distribution;
receives an input of selection of a region of interest which is a region corresponding to a substance in which an influence of a thickness is eliminated in a region corresponding to the article in the first image or the second image;
specifies respective first pixel values of a plurality of first pixels in a region corresponding to the region of interest in the first image and respective second pixel values of a plurality of second pixels corresponding to the plurality of first pixels in the second image, and calculates a function for expressing a relationship between the first pixel values and the second pixel values which is a thickness correction function for eliminating an influence of the thickness of the substance by approximating a relationship between the first pixel values and the second pixel values corresponding to the first pixel values;
calculates a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels; and
calculates an evaluation coefficient based on a correlation between the thickness correction function and the plurality of pieces of calculated representative data,
wherein the at least one processor outputs error information related to an input of selection of the region of interest when the evaluation coefficient is equal to or smaller than a predetermined evaluation coefficient threshold.

28. The radiographic inspection apparatus according to claim 27, wherein the at least one processor
calculates error distances which are distances between the second pixel values calculated using the thickness correction function and corresponding to the first pixel values and actual pixel values of the second pixel values corresponding to the first pixel values regarding the respective first pixel values of the plurality of first pixels,
distinguishes a non-corresponding region which is a region not corresponding to a substance in which an influence of the thickness is eliminated in the first image or the second image on the basis of the error distance, and
outputs the first image or the second image on which the non-corresponding region has been superimposed, as the error information.

29. A non-volatile storage medium including a radiographic inspection program for causing a computer to function as
acquiring a first image in which an article is imaged in a state of being irradiated with a radiation having a first energy distribution, and a second image in which the article is imaged in a state of being irradiated with a radiation having a second energy distribution different from the first energy distribution;
receiving an input of selection of a region of interest which is a region corresponding to a substance in which an influence of a thickness is eliminated in a region corresponding to the article in the first image or the second image;

specifying respective first pixel values of a plurality of first pixels in a region corresponding to the region of interest in the first image and respective second pixel values of a plurality of second pixels corresponding to the plurality of first pixels in the second image, and calculating a function for expressing a relationship between the first pixel values and the second pixel values which is a thickness correction function for eliminating an influence of the thickness of the substance by approximating a relationship between the first pixel values and the second pixel values corresponding to the first pixel values;

calculating a plurality of pieces of representative data each of which is a combination of a first representative value which is a representative pixel value of the first image and a second representative value which is a representative pixel value of the second image on the basis of the respective first pixel values of the plurality of first pixels and the respective second pixel values of the plurality of second pixels corresponding to the plurality of first pixels;

calculating an evaluation coefficient based on a correlation between the thickness correction function and the plurality of pieces of calculated representative data; and outputting error information related to an input of selection of the region of interest when the evaluation coefficient is equal to or smaller than a predetermined evaluation coefficient threshold.

* * * * *